US012640533B2

(12) United States Patent
Cao et al.

(10) Patent No.: US 12,640,533 B2
(45) Date of Patent: May 26, 2026

(54) OPTICAL COMPONENT CONSTITUTING FIBER AMPLIFIER, FIBER AMPLIFIER, AND MANUFACTURING METHOD

(71) Applicant: HUAWEI TECHNOLOGIES CO., LTD., Shenzhen (CN)

(72) Inventors: Shiyi Cao, Shenzhen (CN); Zhiwu Chang, Shenzhen (CN); Shujie Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 810 days.

(21) Appl. No.: 18/073,643

(22) Filed: Dec. 2, 2022

(65) Prior Publication Data

US 2023/0098573 A1     Mar. 30, 2023

Related U.S. Application Data

(63) Continuation of application No. PCT/CN2021/094865, filed on May 20, 2021.

(30) Foreign Application Priority Data

Jun. 4, 2020    (CN) .......................... 202010497761.8

(51) Int. Cl.
H01S 3/067 (2006.01)
H01S 3/00 (2006.01)
H01S 3/094 (2006.01)

(52) U.S. Cl.
CPC ........ H01S 3/06758 (2013.01); H01S 3/0064 (2013.01); H01S 3/0085 (2013.01);
(Continued)

(58) Field of Classification Search
CPC .............. H01S 3/06758; H01S 3/0064; H01S 3/0085; H01S 3/06754; H01S 3/094003;
(Continued)

(56) References Cited

U.S. PATENT DOCUMENTS 5,283,846 A     2/1994  Toyonaka et al.
5,473,713 A     12/1995  Ronarc'h et al.
(Continued)

FOREIGN PATENT DOCUMENTS

CN           1094818 A     11/1994
CN           2600829 Y     1/2004
(Continued)

OTHER PUBLICATIONS

Office Action for Chinese Application No. 202010497761.8 dated Aug. 9, 2022, 5 pages.
International Search Report for PCT/CN2021/094865 dated May 20, 2021, 12 pages.

*Primary Examiner* — Christopher E Leiby

(57) ABSTRACT
The technology of this application relates to an optical component constituting a fiber amplifier, a fiber amplifier, and a manufacturing method. The optical component is connected to a gain fiber by using a first fiber, or the optical component is directly connected to the gain fiber. The optical component is connected to one or more second optical components in the fiber amplifier by using a second fiber, and/or the optical component inputs an optical signal or outputs an optical signal amplified by the gain fiber by using the second fiber. Softening temperatures and/or refractive indexes of the first fiber and the second fiber are different, or softening temperatures and/or refractive indexes of the second fiber and the gain fiber are different.

20 Claims, 11 Drawing Sheets

Line fiber

(52) U.S. Cl.
CPC .................... _H01S 3/06754_ (2013.01); _H01S_
_3/094003_ (2013.01); _H01S 3/094053_ (2013.01)

(58) Field of Classification Search
CPC ............. H01S 3/094053; H01S 3/1001; G02B
6/2746; G02B 6/2938; G02B 6/2937;
G02B 6/255; G02B 6/26; G02B 6/293
See application file for complete search history.

(56) References Cited

U.S. PATENT DOCUMENTS

| | | | |
|---|---|---|---|
| 5,513,033 A | 4/1996 | Bricheno et al. | |
| 6,084,994 A * | 7/2000 | Li | G02B 6/2937 |
| | | | 398/1 |
| 10,348,051 B1 * | 7/2019 | Shah | G01S 17/34 |

| | | | |
|---|---|---|---|
| 2009/0074014 A1* | 3/2009 | Liu | H01S 3/0675 |
| | | | 372/6 |
| 2010/0238559 A1* | 9/2010 | Tanaka | G02B 6/327 |
| | | | 359/811 |
| 2013/0330039 A1* | 12/2013 | Liu | G02B 6/28 |
| | | | 385/33 |
| 2017/0285274 A1* | 10/2017 | Matsumoto | G02B 6/3821 |
| 2020/0116935 A1* | 4/2020 | Muendel | G02B 6/2551 |
| 2021/0041760 A1* | 2/2021 | Qiao | G02F 1/225 |
| 2021/0080644 A1* | 3/2021 | Yoo | G01B 9/02049 |

FOREIGN PATENT DOCUMENTS

| | | |
|---|---|---|
| CN | 101211087 A | 7/2008 |
| CN | 108390245 A | 8/2018 |
| CN | 110829166 A | 2/2020 |
| JP | 2004534271 A | 11/2004 |

* cited by examiner

Line fiber

Optical transmitter → Fiber amplifier → Fiber amplifier → ... → Fiber amplifier → Optical receiver Gain fiber Input an optical signal → WDM → Splicing point 1 — Splicing point 2 → Isolator → Output an optical signal Pump laser Cladding Splicing inclined plane Fiber core Soft glass fiber    Quartz glass substrate fiber (1)

C lens (Cross-sectional view)      (Sectional view)

The C lens that supports dual light paths is spherical (2)

C lens (Cross-sectional view)      (Sectional view)

A curvature radius of an upper part (corresponding to a mixed light path) is small A curvature radius of a lower part (corresponding to a pump light path) is large

1600

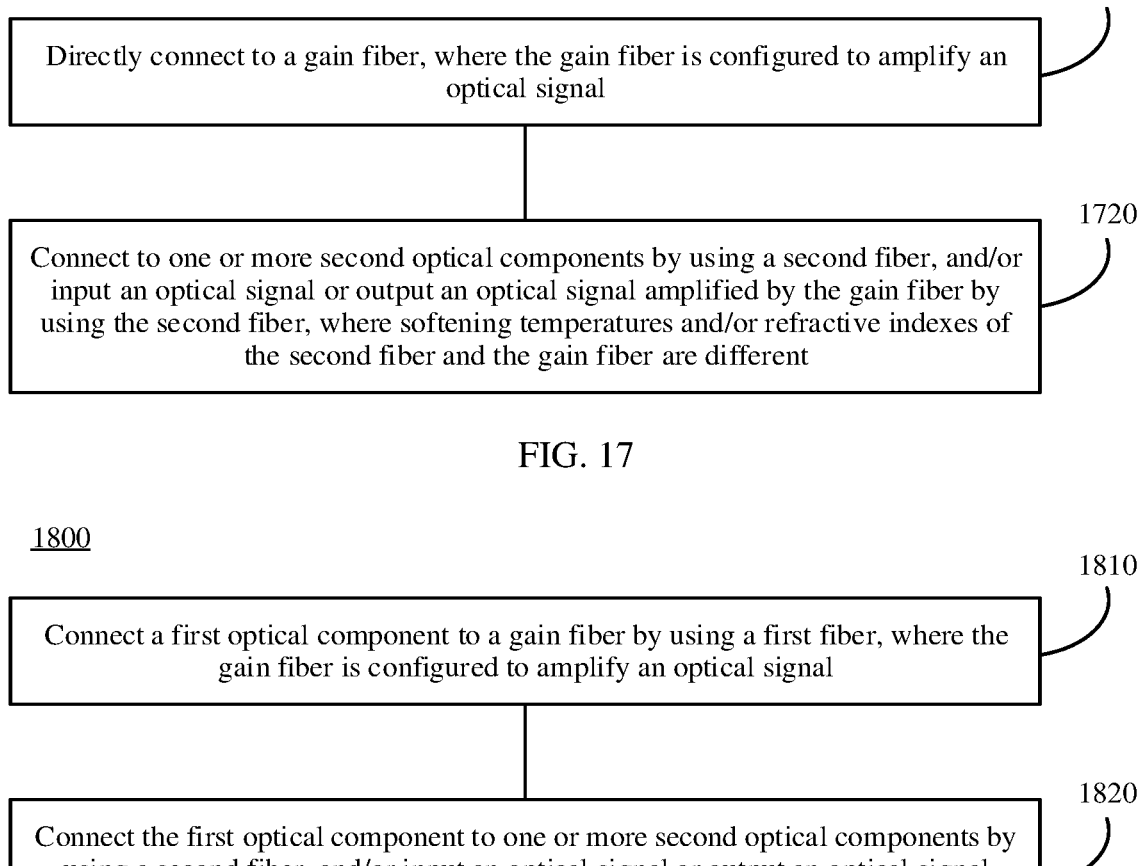

1700

Directly connect to a gain fiber, where the gain fiber is configured to amplify an optical signal | 1710

Connect to one or more second optical components by using a second fiber, and/or input an optical signal or output an optical signal amplified by the gain fiber by using the second fiber, where softening temperatures and/or refractive indexes of the second fiber and the gain fiber are different | 1720

Connect a first optical component to a gain fiber by using a first fiber, where the gain fiber is configured to amplify an optical signal | 1810

Connect the first optical component to one or more second optical components by using a second fiber, and/or input an optical signal or output an optical signal amplified by the gain fiber by using the second fiber, where softening temperatures and/or refractive indexes of the first fiber and the second fiber are different | 1820

FIG. 18

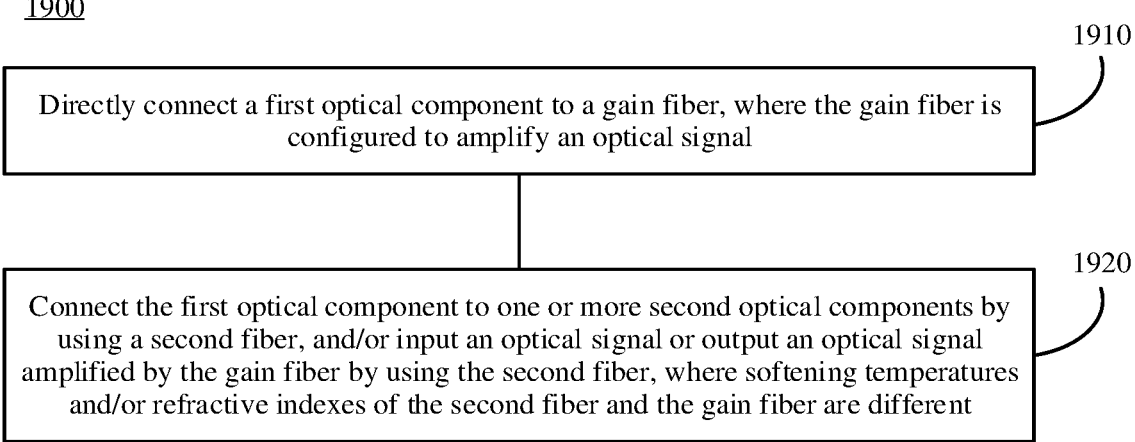

1900

1910

Directly connect a first optical component to a gain fiber, where the gain fiber is configured to amplify an optical signal

1920

Connect the first optical component to one or more second optical components by using a second fiber, and/or input an optical signal or output an optical signal amplified by the gain fiber by using the second fiber, where softening temperatures and/or refractive indexes of the second fiber and the gain fiber are different

FIG. 19

OPTICAL COMPONENT CONSTITUTING FIBER AMPLIFIER, FIBER AMPLIFIER, AND MANUFACTURING METHOD

CROSS-REFERENCE TO RELATED APPLICATIONS

This application is a continuation of International Application No. PCT/CN2021/094865, filed on May 20, 2021, which claims priority to Chinese Patent Application No. 202010497761.8, filed on Jun. 4, 2020. The disclosures of the aforementioned applications are hereby incorporated by reference in their entireties.

TECHNICAL FIELD

This application relates to the communication field, and more specifically, to an optical component constituting a fiber amplifier, a fiber amplifier, and a manufacturing method.

BACKGROUND

In a fiber communication network, a gain fiber in a common fiber amplifier is a quartz glass matrix erbium-doped fiber, and a pigtail of an optical component such as a wavelength division multiplexer (WDM) and an isolator in the fiber amplifier is a quartz glass matrix fiber. To be specific, matrixes of the gain fiber and the pigtail of the optical component are the same. Both of the gain fiber and the pigtail of the optical component are quartz glass matrix fibers, and softening temperatures and refractive indexes of the two fibers are similar. Therefore, it is easy to splice pigtails and gain fibers of the WDM and isolator, and splicing performance is good.

In some wide-spectrum fiber amplifiers, gain fibers of other matrixes may be used to improve a gain of an optical signal. For example, some soft glass fibers are used, such as a tellurium erbium-doped fiber (erbium-doped in a tellurite glass fiber) and a fluoride thulium-doped fiber (thulium-doped in a fluoride glass fiber). However, it is difficult to splice a gain fiber and a quartz glass matrix fiber (that is, a pigtail of an optical component), and splicing performance is poor. Therefore, performance of the fiber amplifier is low.

SUMMARY

This application provides an optical component constituting a fiber amplifier, a fiber amplifier, and a manufacturing method, so that a pigtail of the optical component can be designed according to a requirement. This improves application flexibility of the fiber amplifier, and improves use performance of the fiber amplifier. For example, in some designs, a fiber connection loss is greatly reduced, a gain of the optical amplifier is improved, a noise coefficient, processing difficulty, costs are reduced, and performance of a fiber amplifier formed by heterogeneous fibers is improved.

According to a first aspect, an optical component is provided. The optical component is applied to a fiber amplifier, the optical component is connected to a gain fiber by using a first fiber, and the gain fiber is configured to amplify an optical signal. The optical component is connected to one or more second optical components in the fiber amplifier by using a second fiber, and/or the optical component inputs an optical signal or outputs an optical signal amplified by the gain fiber by using the second fiber; and softening temperatures and/or refractive indexes of the first fiber and the second fiber are different.

The foregoing technical solution is applied to an optical component in the fiber amplifier. Refractive indexes and/or softening temperatures of a fiber connected to the gain fiber and a fiber connected to another optical component (for example, denoted as a second optical component) or a fiber through which an optical signal is input/output (for example, an optical signal amplified by the gain fiber) are different. In a solution, the optical component may be connected to the gain fiber by using the first fiber, and the optical component may be connected to another optical component, may input an optical signal, or may output an optical signal amplified by the gain fiber by using the second fiber. In this manner, the fiber amplifier may be flexibly designed according to a requirement, for example, a pigtail (that is, the first fiber and the second fiber) of an optical component. This improves use performance of the fiber amplifier. For example, when splicing performance between the first fiber and the gain fiber needs to be improved, the first fiber may be designed as a fiber whose matrix is the same as or similar to a matrix of the gain fiber. Alternatively, the first fiber may be designed as a fiber having a smaller difference in a softening temperature and/or a refractive index from the gain fiber. In this way, a heterogeneous fiber connection loss can be greatly reduced.

With reference to the first aspect, in some implementations of the first aspect, an absolute value of a difference between the softening temperatures of the first fiber and the second fiber is greater than an absolute value of a difference between softening temperatures of the first fiber and the gain fiber; and/or an absolute value of the difference between the refractive indexes of the first fiber and the second fiber is greater than an absolute value of a difference between refractive indexes of the first fiber and the gain fiber.

In one example, a matrix of the first fiber is the same as or similar to a matrix of the gain fiber.

An absolute value of a difference is used to reflect that two fibers are different. For example, if the absolute value of the difference between the softening temperatures of the first fiber and the second fiber is greater than the absolute value of the difference between the softening temperatures of the first fiber and the gain fiber, it indicates that the difference between the softening temperatures of the first fiber and the second fiber is greater than the difference between the softening temperatures of the first fiber and the gain fiber. For another example, if the absolute value of the difference between the refractive indexes of the first fiber and the second fiber is greater than the absolute value of the difference between the refractive indexes of the first fiber and the gain fiber, it indicates that the difference between the refractive indexes of the first fiber and the second fiber is greater than the difference between the refractive indexes of the first fiber and the gain fiber.

Based on the foregoing technical solution, the absolute value of the difference between the softening temperatures of the first fiber and the second fiber is greater than the absolute value of the difference between the softening temperatures of the first fiber and the gain fiber; and/or the absolute value of the difference between the refractive indexes of the first fiber and the second fiber is greater than the absolute value of the difference between the refractive index differences of the first fiber and the gain fiber. For example, the optical component in the fiber amplifier may be connected to the gain fiber by using the first fiber whose matrix is the same as or similar to a matrix of the gain fiber, and the optical component may be connected to another optical component, may input an optical signal, or may output an optical signal by using the second fiber whose matrix is different from the matrix of the gain fiber. To be specific, a matrix of a fiber connected to the gain fiber is the same as or similar to the matrix of the gain fiber. Therefore, a fiber connection loss can be greatly reduced. In addition, a fiber connection loss is reduced. This helps improve a gain of the fiber amplifier, and reduces a noise coefficient, manufacturing difficulty, and costs. Therefore, the technical solution is expected to be an essential technology for amplifying an optical signal at an L/S band.

With reference to the first aspect, in some implementations of the first aspect, an optical signal input by the optical component by using the second fiber arrives at the first fiber through at least a section of free space; or an optical signal input by the optical component by using the first fiber arrives at the second fiber through at least a section of free space.

With reference to the first aspect, in some implementations of the first aspect, the optical component includes at least one capillary tube, and the at least one capillary tube is configured to introduce, into the optical component, the first fiber and/or the second fiber from which a coating layer is stripped.

For example, the optical component includes at least one fiber connector, and the at least one fiber connector is configured to introduce, into the optical component, the first fiber and/or the second fiber from which the coating layer is stripped.

It should be understood that all capillary tubes mentioned in the following may be replaced with fiber connectors. A person skilled in the art should understand meanings of the capillary tube and the fiber connector. The fiber connector is an integral component, and the capillary tube is a key part in the fiber connector.

It should be further understood that introducing a fiber into the optical component means that a fiber is assembled into the optical component. A transmission direction of an optical signal in the fiber is not limited. For example, an introduced fiber may be configured to input an optical signal, may be configured to output an optical signal, and may be configured to input and output optical signals at the same time.

With reference to the first aspect, in some implementations of the first aspect, the first fiber and the gain fiber are connected in a splicing manner.

With reference to the first aspect, in some implementations of the first aspect, the optical component is any one or more of the following: a wavelength division multiplexer WDM, an isolator, and a fiber adapter.

For example, the WDM is configured to introduce pump light emitted by a pump laser into the gain fiber.

For another example, the isolator is configured to: allow an optical signal transmitted in one direction to pass through or allow an optical signal transmitted in one direction to have a low loss, and prevent an optical signal transmitted in a reverse direction from passing through or allow an optical signal transmitted in a reverse direction to have a large loss.

In still another example, the fiber adapter is configured to connect the first fiber and the second fiber.

With reference to the first aspect, in some implementations of the first aspect, the optical component is the WDM, and the WDM includes a two-fiber capillary tube. The two-fiber capillary tube is configured to introduce two fibers into the WDM. One of the two fibers is the first fiber, the other fiber of the two fibers is the second fiber, and the other fiber of the two fibers is configured to: connect to a pump laser, input an optical signal, or output the optical signal amplified by the gain fiber.

For example, the WDM is configured to introduce the pump light emitted by the pump laser into the gain fiber.

With reference to the first aspect, in some implementations of the first aspect, the two fibers in the two-fiber capillary tube are not parallel.

For example, the two fibers in the two-fiber capillary tube are not parallel.

With reference to the first aspect, in some implementations of the first aspect, the WDM includes a first lens, and the first lens is configured to adjust light beams of optical signals in the two fibers in the two-fiber capillary tube.

With reference to the first aspect, in some implementations of the first aspect, a curvature radius of a curved surface part of an optical path of an optical signal in the first fiber corresponding to the first lens is less than a curvature radius of a curved surface part of an optical path of an optical signal in the second fiber corresponding to the first lens; or a radial refractive index of an optical path of an optical signal in the first fiber corresponding to the first lens changes faster than a radial refractive index of an optical path of an optical signal in the second fiber corresponding to the first lens.

With reference to the first aspect, in some implementations of the first aspect, the first lens allows that spotsizes of the optical signals in the two fibers in the two-fiber capillary tube are different.

With reference to the first aspect, in some implementations of the first aspect, spotsizes of the optical signals in the two fibers in the two-fiber capillary tube match.

With reference to the first aspect, in some implementations of the first aspect, the optical component is the isolator; and the isolator includes a first one-fiber capillary tube and a second one-fiber capillary tube, where the first one-fiber capillary tube is configured to introduce the first fiber into the isolator, and the second one-fiber capillary tube is configured to introduce the second fiber into the isolator.

For example, the isolator is configured to: allow an optical signal transmitted in one direction to pass through or allow an optical signal transmitted in one direction to have a low loss, and prevent an optical signal transmitted in a reverse direction from passing through or allow an optical signal transmitted in a reverse direction to have a large loss.

With reference to the first aspect, in some implementations of the first aspect, a fiber in the first one-fiber capillary tube and a fiber in the second one-fiber capillary tube are not parallel.

With reference to the first aspect, in some implementations of the first aspect, the isolator includes a second lens and a third lens. The second lens is configured to adjust a light beam of an optical signal of the fiber in the first one-fiber capillary tube, and the third lens is configured to adjust a light beam of an optical signal of the fiber in the second one-fiber capillary tube.

With reference to the first aspect, in some implementations of the first aspect, a focal length of the second lens is less than a focal length of the third lens.

With reference to the first aspect, in some implementations of the first aspect, the optical component is the fiber adapter, and the fiber adapter includes a third one-fiber capillary tube and a fourth one-fiber capillary tube. The third one-fiber capillary tube is configured to introduce the first fiber into the fiber adapter, and the fourth one-fiber capillary tube is configured to introduce the second fiber into the fiber adapter.

With reference to the first aspect, in some implementations of the first aspect, a fiber in the third one-fiber capillary tube and a fiber in the fourth one-fiber capillary tube are not parallel.

With reference to the first aspect, in some implementations of the first aspect, the fiber adapter includes a fourth lens and a fifth lens, where and the fourth lens is configured to adjust a light beam of an optical signal of the fiber in the third one-fiber capillary tube, and the fifth lens is configured to adjust a light beam of an optical signal of the fiber in the fourth one-fiber capillary tube.

With reference to the first aspect, in some implementations of the first aspect, a focal length of the fourth lens is less than a focal length of the fifth lens.

According to a second aspect, an optical component is provided. The optical component is applied in a fiber amplifier, the optical component is directly connected to a gain fiber, and the gain fiber is configured to amplify an optical signal. The optical component is connected to one or more second optical components in the fiber amplifier by using a second fiber, and/or the optical component inputs an optical signal or outputs an optical signal amplified by the gain fiber by using the second fiber; and softening temperatures and/or refractive indexes of the second fiber and the gain fiber are different.

A first optical component is directly connected to the gain fiber. To be specific, a pigtail connecting the first optical component to the gain fiber is the gain fiber, and there is no splicing point between the first optical component and the gain fiber.

The foregoing technical solution is applied to an optical component in the fiber amplifier. Refractive indexes and/or softening temperatures of the gain fiber and a fiber connected to another optical component (for example, a second optical component) or a fiber through which an optical signal is input/output (for example, an optical signal amplified by the gain fiber) are different. In a solution, the optical component may be directly connected to the gain fiber, and the optical component may be connected to another optical component, may input an optical signal, or may output an optical signal amplified by the gain fiber by using the second fiber. In this manner, a heterogeneous fiber connection loss can be minimized. This helps improve a gain of the fiber amplifier, and reduces a noise coefficient, manufacturing difficulty, and costs. Therefore, the technical solution is expected to be an essential technology for amplifying an optical signal at an L/S band.

With reference to the second aspect, in some implementations of the second aspect, an optical signal input by the optical component by using the second fiber arrives at the gain fiber through at least a section of free space; or an optical signal input by the optical component by using the gain fiber arrives at the second fiber through at least a section of free space.

With reference to the second aspect, in some implementations of the second aspect, the optical component includes at least one capillary tube, and the at least one capillary tube is configured to introduce, into the optical component, the second fiber and/or the gain fiber from which a coating layer is stripped.

With reference to the second aspect, in some implementations of the second aspect, the optical component is any one or more of the following: a wavelength division multiplexer WDM, an isolator, and a fiber adapter.

For example, the WDM is configured to introduce pump light emitted by a pump laser into the gain fiber.

For another example, the isolator is configured to: allow an optical signal transmitted in one direction to pass through or allow an optical signal transmitted in one direction to have a low loss, and prevent an optical signal transmitted in a reverse direction from passing through or allow an optical signal transmitted in a reverse direction to have a large loss.

In still another example, the fiber adapter is configured to connect the second fiber and the gain fiber.

With reference to the second aspect, in some implementations of the second aspect, the optical component is the WDM, and the WDM includes a two-fiber capillary tube. The two-fiber capillary tube is configured to introduce two fibers into the WDM. One of the two fibers is the gain fiber, the other one of the two fibers is the second fiber, and the other one of the two fibers is configured to: connect to a pump laser, input an optical signal, or output the optical signal amplified by the gain fiber.

For example, the WDM is configured to introduce pump light emitted by a pump laser into the gain fiber.

With reference to the second aspect, in some implementations of the second aspect, the two fibers in the two-fiber capillary tube are not parallel.

With reference to the second aspect, in some implementations of the second aspect, the WDM includes a first lens, and the first lens is configured to adjust light beams of optical signals in the two fibers in the two-fiber capillary tube.

With reference to the second aspect, in some implementations of the second aspect, a curvature radius of a curved surface part of an optical path of an optical signal in the gain fiber corresponding to the first lens is less than a curvature radius of a curved surface part of an optical path of an optical signal in the second fiber corresponding to the first lens; or a radial refractive index of an optical path of an optical signal in the gain fiber corresponding to the first lens changes faster than a radial refractive index of an optical path of an optical signal in the second fiber corresponding to the first lens.

With reference to the second aspect, in some implementations of the second aspect, the first lens allows that spotsizes of the optical signals in the two fibers in the two-fiber capillary tube are different.

With reference to the second aspect, in some implementations of the second aspect, spotsizes of the optical signals in the two fibers in the two-fiber capillary tube match.

With reference to the second aspect, in some implementations of the second aspect, the optical component is the isolator, and the isolator includes a first one-fiber capillary tube and a second one-fiber capillary tube. The first one-fiber capillary tube is configured to introduce the gain fiber into the isolator, and the second one-fiber capillary tube is configured to introduce the second fiber into the isolator.

For example, the isolator is configured to: allow an optical signal transmitted in one direction to pass through or allow an optical signal transmitted in one direction to have a low loss, and prevent an optical signal transmitted in a reverse direction from passing through or allow an optical signal transmitted in a reverse direction to have a large loss.

With reference to the second aspect, in some implementations of the second aspect, a fiber in the first one-fiber capillary tube and a fiber in the second one-fiber capillary tube are not parallel.

With reference to the second aspect, in some implementations of the second aspect, the isolator includes a second lens and a third lens. The second lens is configured to adjust a light beam of an optical signal of the fiber in the first one-fiber capillary tube, and the third lens is configured to adjust a light beam of an optical signal of the fiber in the second one-fiber capillary tube.

With reference to the second aspect, in some implementations of the second aspect, a focal length of the second lens is less than a focal length of the third lens.

With reference to the second aspect, in some implementations of the second aspect, the optical component is the fiber adapter, and the fiber adapter includes a third one-fiber capillary tube and a fourth one-fiber capillary tube. The third one-fiber capillary tube is configured to introduce the gain fiber into the fiber adapter, and the fourth one-fiber capillary tube is configured to introduce the second fiber into the fiber adapter.

With reference to the second aspect, in some implementations of the second aspect, a fiber in the third one-fiber capillary tube and a fiber in the fourth one-fiber capillary tube are not parallel.

With reference to the second aspect, in some implementations of the second aspect, the fiber adapter includes a fourth lens and a fifth lens. The fourth lens is configured to adjust a light beam of an optical signal of the fiber in the third one-fiber capillary tube, and the fifth lens is configured to adjust a light beam of an optical signal of the fiber in the fourth one-fiber capillary tube.

With reference to the second aspect, in some implementations of the second aspect, a focal length of the fourth lens is less than a focal length of the fifth lens.

According to a third aspect, a fiber amplifier is provided. The fiber amplifier includes a first optical component, a gain fiber, and one or more second optical components, where the gain fiber is configured to amplify an optical signal. The first optical component is connected to the gain fiber by using a first fiber. The first optical component is connected to the one or more second optical components by using a second fiber, and/or the first optical component inputs an optical signal or outputs an optical signal amplified by the gain fiber by using the second fiber; and softening temperatures and/or refractive indexes of the first fiber and the second fiber are different.

With reference to the third aspect, in some implementations of the third aspect, the first optical component is the optical component according to any one of the first aspect or the possible implementations of the first aspect.

According to a fourth aspect, a fiber amplifier is provided. The fiber amplifier includes a first optical component, a gain fiber, and one or more second optical components, where the gain fiber is configured to amplify an optical signal. The first optical component is directly connected to the gain fiber. The first optical component is connected to the one or more second optical components by using a second fiber, and/or the first optical component inputs an optical signal or outputs an optical signal amplified by the gain fiber by using the second fiber; and softening temperatures and/or refractive indexes of the second fiber and the gain fiber are different.

With reference to the fourth aspect, in some implementations of the fourth aspect, the first optical component is the optical component according to any one of the second aspect or the possible implementations of the second aspect.

According to a fifth aspect, a method for manufacturing an optical component is provided. The method includes: connecting to a gain fiber by using a first fiber, where the gain fiber is configured to amplify an optical signal; connecting to one or more second optical components by using a second fiber, and/or inputting an optical signal or outputting an optical signal amplified by the gain fiber by using the second fiber; and softening temperatures and/or refractive indexes of the first fiber and the second fiber are different.

With reference to the fifth aspect, in some implementations of the fifth aspect, an absolute value of a difference between the softening temperatures of the first fiber and the second fiber is greater than an absolute value of a difference between softening temperatures of the first fiber and the gain fiber.

With reference to the fifth aspect, in some implementations of the fifth aspect, an absolute value of a difference between the refractive indexes of the first fiber and the second fiber is greater than an absolute value of a difference between refractive indexes of the first fiber and the gain fiber.

In one example, a matrix of the first fiber is the same as or similar to a matrix of the gain fiber.

With reference to the fifth aspect, in some implementations of the fifth aspect, an optical signal input by using the second fiber arrives at the first fiber through at least a section of free space; or an optical signal input by using the first fiber arrives at the second fiber through at least a section of free space.

With reference to the fifth aspect, in some implementations of the fifth aspect, the optical component includes at least one capillary tube, and the first fiber and/or the second fiber from which a coating layer is stripped are/is introduced into the optical component through the at least one capillary tube.

With reference to the fifth aspect, in some implementations of the fifth aspect, the first fiber and the gain fiber are connected in a splicing manner.

With reference to the fifth aspect, in some implementations of the fifth aspect, the optical component is any one or more of the following: a wavelength division multiplexer WDM, an isolator, and a fiber adapter.

For example, the WDM is configured to introduce pump light emitted by a pump laser into the gain fiber.

For another example, the isolator is configured to: allow an optical signal transmitted in one direction to pass through or allow an optical signal transmitted in one direction to have a low loss, and prevent an optical signal transmitted in a reverse direction from passing through or allow an optical signal transmitted in a reverse direction to have a large loss.

In still another example, the fiber adapter is configured to connect the first fiber and the second fiber.

With reference to the fifth aspect, in some implementations of the fifth aspect, the optical component is the WDM, and the WDM includes a two-fiber capillary tube. Two fibers are introduced into the WDM through the two-fiber capillary tube. One of the two fibers is the first fiber, the other one of the two fibers is the second fiber, and the other one of the two fibers is configured to: connect to a pump laser, input an optical signal, or output an optical signal amplified by the gain fiber.

With reference to the fifth aspect, in some implementations of the fifth aspect, the two fibers in the two-fiber capillary tube are not parallel.

With reference to the fifth aspect, in some implementations of the fifth aspect, the WDM includes a first lens, and light beams of optical signals in the two fibers in the two-fiber capillary tube are adjusted by using the first lens.

With reference to the fifth aspect, in some implementations of the fifth aspect, a curvature radius of a curved surface part of an optical path of an optical signal in the first fiber corresponding to the first lens is less than a curvature radius of a curved surface part of an optical path of an optical signal in the second fiber corresponding to the first lens; or a radial refractive index of an optical path of an optical signal in the first fiber corresponding to the first lens changes faster than a radial refractive index of an optical path of an optical signal in the second fiber corresponding to the first lens.

With reference to the fifth aspect, in some implementations of the fifth aspect, the first lens allows that spotsizes of the optical signals in the two fibers in the two-fiber capillary tube are different.

With reference to the fifth aspect, in some implementations of the fifth aspect, spotsizes of the optical signals in the two fibers in the two-fiber capillary tube match.

With reference to the fifth aspect, in some implementations of the fifth aspect, the optical component is the isolator; and the isolator includes a first one-fiber capillary tube and a second one-fiber capillary tube. The first fiber is introduced into the isolator through the first one-fiber capillary tube, and the second fiber is introduced into the isolator through the second one-fiber capillary tube.

For example, the isolator is configured to: allow an optical signal transmitted in one direction to pass through or allow an optical signal transmitted in one direction to have a low loss, and prevent an optical signal transmitted in a reverse direction from passing through or allow an optical signal transmitted in a reverse direction to have a large loss.

With reference to the fifth aspect, in some implementations of the fifth aspect, a fiber in the first one-fiber capillary tube and a fiber in the second one-fiber capillary tube are not parallel.

With reference to the fifth aspect, in some implementations of the fifth aspect, the isolator includes a second lens and a third lens. A light beam of an optical signal of a fiber in the first one-fiber capillary tube is adjusted by using the second lens, and a light beam of an optical signal of a fiber in the second one-fiber capillary tube is adjusted by using the third lens.

With reference to the fifth aspect, in some implementations of the fifth aspect, a focal length of the second lens is less than a focal length of the third lens.

With reference to the fifth aspect, in some implementations of the fifth aspect, the optical component is the fiber adapter, and the fiber adapter includes a third one-fiber capillary tube and a fourth one-fiber capillary tube. The first fiber is introduced into the fiber adapter through the third one-fiber capillary tube, and the second fiber is introduced into the fiber adapter through the fourth one-fiber capillary tube.

With reference to the fifth aspect, in some implementations of the fifth aspect, a fiber in the third one-fiber capillary tube and a fiber in the fourth one-fiber capillary tube are not parallel.

With reference to the fifth aspect, in some implementations of the fifth aspect, the fiber adapter includes a fourth lens and a fifth lens. A light beam of an optical signal of a fiber in the third one-fiber capillary tube is adjusted by using the fourth lens, and a light beam of an optical signal of a fiber in the fourth one-fiber capillary tube is adjusted by using the fifth lens.

With reference to the fifth aspect, in some implementations of the fifth aspect, a focal length of the fourth lens is less than a focal length of the fifth lens.

According to a sixth aspect, a method for manufacturing an optical component is provided. The method includes: directly connecting to a gain fiber, where the gain fiber is configured to amplify an optical signal; and connecting to one or more second optical components in a fiber amplifier by using a second fiber, and/or inputting an optical signal or outputting an optical signal amplified by the gain fiber by using the second fiber; and softening temperatures and/or refractive indexes of the second fiber and the gain fiber are different.

With reference to the sixth aspect, in some implementations of the sixth aspect, an optical signal input by using the second fiber arrives at the gain fiber through at least a section of free space; or an optical signal input by using the gain fiber arrives at the second fiber through at least a section of free space.

With reference to the sixth aspect, in some implementations of the sixth aspect, the optical component includes at least one capillary tube, and the second fiber and/or the gain fiber from which a coating layer is stripped are/is introduced into the optical component through the at least one capillary tube.

With reference to the sixth aspect, in some implementations of the sixth aspect, the optical component is any one or more of the following: a wavelength division multiplexer WDM, an isolator, and a fiber adapter.

For example, the WDM is configured to introduce pump light emitted by a pump laser into the gain fiber.

For another example, the isolator is configured to: allow an optical signal transmitted in one direction to pass through or allow an optical signal transmitted in one direction to have a low loss, and prevent an optical signal transmitted in a reverse direction from passing through or allow an optical signal transmitted in a reverse direction to have a large loss.

In still another example, the fiber adapter is configured to connect the second fiber and the gain fiber.

With reference to the sixth aspect, in some implementations of the sixth aspect, the optical component is the WDM, and the WDM includes a two-fiber capillary tube. Two fibers are introduced into the WDM through the two-fiber capillary tube. One of the two fibers is the gain fiber, the other one of the two fibers is the second fiber, and the other one of the two fibers is configured to: connect to a pump laser, input an optical signal, or output an optical signal amplified by the gain fiber.

With reference to the sixth aspect, in some implementations of the sixth aspect, the two fibers in the two-fiber capillary tube are not parallel.

With reference to the sixth aspect, in some implementations of the sixth aspect, the WDM includes a first lens, and light beams of optical signals in the two fibers in the two-fiber capillary tube are adjusted by using the first lens.

With reference to the sixth aspect, in some implementations of the sixth aspect, a curvature radius of a curved surface part of an optical path of an optical signal in the gain fiber corresponding to the first lens is less than a curvature radius of a curved surface part of an optical path of an optical signal in the second fiber corresponding to the first lens; or a radial refractive index of an optical path of an optical signal in the gain fiber corresponding to the first lens changes faster than a radial refractive index of an optical path of an optical signal in the second fiber corresponding to the first lens.

With reference to the sixth aspect, in some implementations of the sixth aspect, the first lens allows that spotsizes of the optical signals in the two fibers in the two-fiber capillary tube are different.

With reference to the sixth aspect, in some implementations of the sixth aspect, spotsizes of the optical signals in the two fibers in the two-fiber capillary tube match.

With reference to the sixth aspect, in some implementations of the sixth aspect, the optical component is the isolator, and the isolator includes a first one-fiber capillary tube and a second one-fiber capillary tube. The gain fiber is introduced into the isolator through the first one-fiber capillary tube, and the second fiber is introduced into the isolator through the second one-fiber capillary tube.

For example, the isolator is configured to: allow an optical signal transmitted in one direction to pass through or allow an optical signal transmitted in one direction to have a low loss, and prevent an optical signal transmitted in a reverse direction from passing through or allow an optical signal transmitted in a reverse direction to have a large loss.

With reference to the sixth aspect, in some implementations of the sixth aspect, a fiber in the first one-fiber capillary tube and a fiber in the second one-fiber capillary tube are not parallel.

With reference to the sixth aspect, in some implementations of the sixth aspect, the isolator includes a second lens and a third lens. A light beam of an optical signal of a fiber in the first one-fiber capillary tube is adjusted by using the second lens, and a light beam of an optical signal of a fiber in the second one-fiber capillary tube is adjusted by using the third lens.

With reference to the sixth aspect, in some implementations of the sixth aspect, a focal length of the second lens is less than a focal length of the third lens.

With reference to the sixth aspect, in some implementations of the sixth aspect, the optical component is the fiber adapter, and the fiber adapter includes a third one-fiber capillary tube and a fourth one-fiber capillary tube. The gain fiber is introduced into the fiber adapter through the third one-fiber capillary tube, and the second fiber is introduced into the fiber adapter through the fourth one-fiber capillary tube.

With reference to the sixth aspect, in some implementations of the sixth aspect, a fiber in the third one-fiber capillary tube and a fiber in the fourth one-fiber capillary tube are not parallel.

With reference to the sixth aspect, in some implementations of the sixth aspect, the fiber adapter includes a fourth lens and a fifth lens. A light beam of an optical signal of a fiber in the third one-fiber capillary tube is adjusted by using the fourth lens, and a light beam of an optical signal of a fiber in the fourth one-fiber capillary tube is adjusted by using the fifth lens.

With reference to the sixth aspect, in some implementations of the sixth aspect, a focal length of the fourth lens is less than a focal length of the fifth lens.

According to a seventh aspect, a method for manufacturing a fiber amplifier is provided. The fiber amplifier includes a first optical component, a gain fiber, and one or more second optical components, where the gain fiber is configured to amplify an optical signal. The method includes: connecting the first optical component to the gain fiber by using a first fiber; and connecting the first optical component to the one or more second optical components by using a second fiber, and/or inputting an optical signal or outputting an optical signal amplified by the gain fiber by using the second fiber; and softening temperatures and/or refractive indexes of the first fiber and the second fiber are different.

With reference to the seventh aspect, in some implementations of the seventh aspect, the first optical component is the optical component according to any one of the first aspect or the possible implementations of the first aspect; or the first optical component is an optical component manufactured based on the method according to any one of the fifth aspect and the possible implementations of the fifth aspect.

According to an eighth aspect, a method for manufacturing a fiber amplifier is provided. The fiber amplifier includes a first optical component, a gain fiber, and one or more second optical components, where the gain fiber is configured to amplify an optical signal. The method includes: directly connecting the first optical component to the gain fiber; and connecting the first optical component to the one or more second optical components by using a second fiber, and/or inputting an optical signal or outputting an optical signal amplified by the gain fiber by using the second fiber; and softening temperatures and/or refractive indexes of the second fiber and the gain fiber are different.

With reference to the eighth aspect, in some implementations of the eighth aspect, the first optical component is the optical component according to any one of the second aspect or the possible implementations of the second aspect; or the first optical component is an optical component manufactured based on the method according to any one of the sixth aspect and the possible implementations of the sixth aspect.

According to a ninth aspect, a manufacturing method for a wavelength division multiplexer WDM is provided. The WDM is applied to a fiber amplifier, and the WDM includes a two-fiber capillary tube. The method includes: introducing two fibers into the WDM through the two-fiber capillary tube, where one of the two fibers is a first fiber or a gain fiber, the other one of the two fibers is a second fiber, and the other one of the two fibers is configured to: connect to a pump laser, input an optical signal, or output the optical signal amplified by the gain fiber. Softening temperatures and/or refractive indexes of first fiber and the second fiber are different; or softening temperatures and/or refractive indexes of the second fiber and the gain fiber are different.

With reference to the ninth aspect, in some implementations of the ninth aspect, the WDM is the WDM according to any one of the first aspect to the eighth aspect.

According to a tenth aspect, a manufacturing method for an isolator is provided. The isolator is applied to a fiber amplifier, and the isolator includes a first one-fiber capillary tube and a second one-fiber capillary tube. The method includes: introducing a first fiber or a gain fiber into the isolator through the first one-fiber capillary tube; and introducing a second fiber into the isolator through the second one-fiber capillary tube; and softening temperatures and/or refractive indexes of the first fiber and the second fiber have different, or softening temperatures and/or refractive indexes of the second fiber and the gain fiber are different.

With reference to the tenth aspect, in some implementations of the tenth aspect, the isolator is the isolator according to any one of the first aspect to the eighth aspect.

According to an eleventh aspect, a manufacturing method for a fiber adapter is provided. The fiber adapter is applied to a fiber amplifier, and the fiber adapter includes a third one-fiber capillary tube and a fourth one-fiber capillary tube. The method includes: introducing a first fiber or a gain fiber into the fiber adapter through the third one-fiber capillary tube; and introducing a second fiber into the fiber adapter through the fourth one-fiber capillary tube; and softening temperatures and/or refractive indexes of the first fiber and the second fiber are different, or softening temperatures and/or refractive indexes of the second fiber and the gain fiber are different.

With reference to the eleventh aspect, in some implementations of the eleventh aspect, the fiber adapter is the fiber adapter according to any one of the first aspect to the eighth aspect.

According to a twelfth aspect, a lens is provided. An optical path passing through the lens includes a first optical path and a second optical path. A curvature radius of a curved surface part of the first optical path corresponding to the lens is less than a curvature radius of a curved surface part of the second optical path corresponding to the lens; or a radial refractive index of the first optical path corresponding to the lens changes faster than a radial refractive index of the second optical path corresponding to the lens.

With reference to the twelfth aspect, in some implementations of the twelfth aspect, the lens is the first lens according to the first aspect or the second aspect and any possible implementation of the first aspect or the second aspect.

BRIEF DESCRIPTION OF DRAWINGS

FIG. 17 is an example schematic diagram of a method for manufacturing an optical component according to still another embodiment of this application;

FIG. 18 is an example schematic diagram of a method for manufacturing a fiber amplifier according to an embodiment of this application; and FIG. 19 is an example schematic diagram of a method for manufacturing a fiber amplifier according to still another embodiment of this application.

DESCRIPTION OF EMBODIMENTS

The following describes technical solutions of this application with reference to accompanying drawings.

The technical solutions in embodiments of this application may be applied to a fiber communication network. For example, the technical solutions in embodiments of this application may be applied to a fiber amplifier in the fiber communication network, and the fiber amplifier is mainly located at an optical amplifier site and an optical amplifier network element in the fiber communication network. The technical solutions in embodiments of this application may be applied to a fiber amplifier formed by heterogeneous fibers, or may be applied a fiber amplifier formed by fibers having different spotsizes (including different spotsize diameters and/or different numerical apertures). The following describes in detail a scenario applicable to embodiments of this application with reference to FIG. 1.

Figures 1, 2, 3:
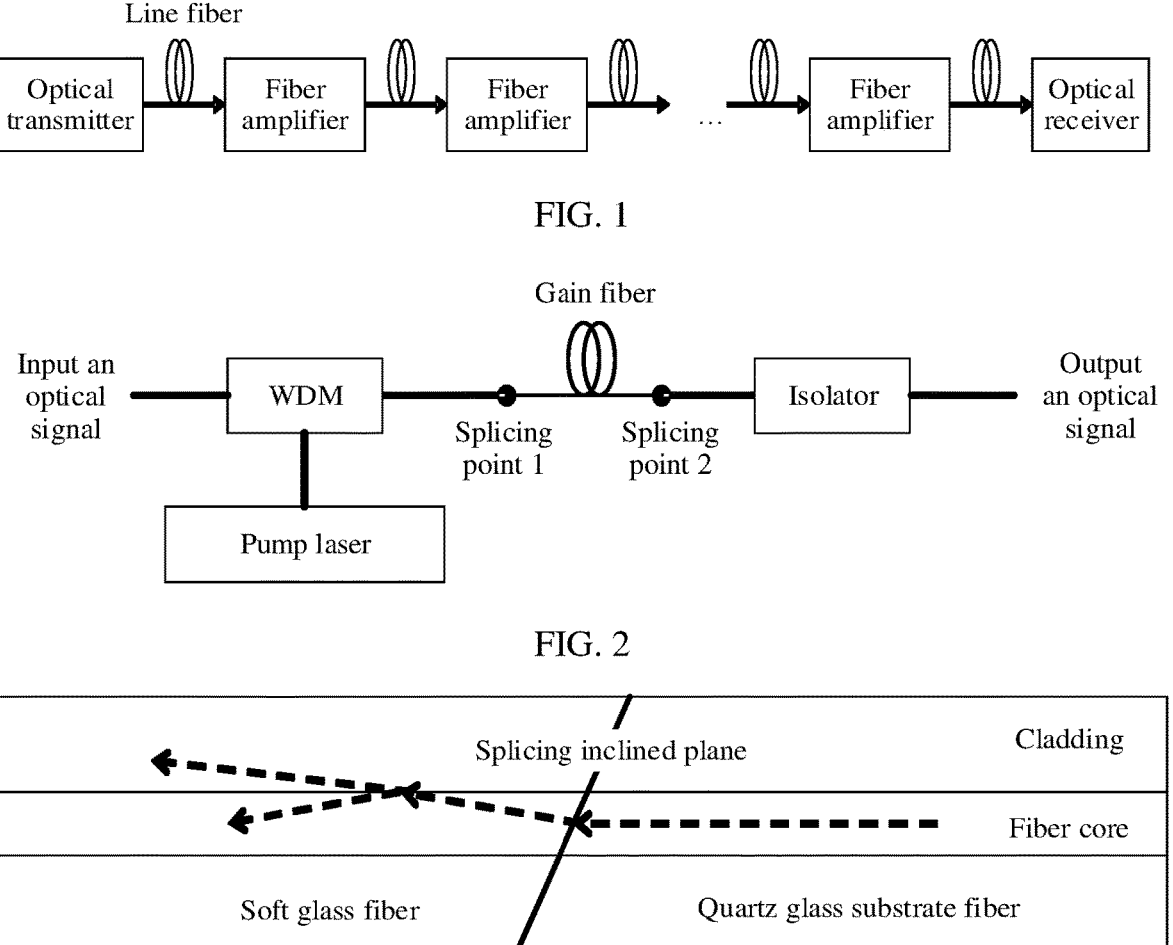
FIG. 1 is an example schematic diagram of an application scenario applicable to an embodiment of this application.
FIG. 2 is an example schematic diagram of a structure of a fiber amplifier applicable to an embodiment of this application.
FIG. 3 is an example schematic diagram of refraction of a heterogeneous fiber with different refractive indexes.

FIG. 1 is a schematic diagram of an application scenario applicable to an embodiment of this application. A fiber communication network may include an optical transmitter, an optical receiver, and one or more fiber amplifiers. As shown in FIG. 1, the fiber amplifier is mainly located in the middle of a fiber line (or a line fiber) in the fiber communication network to amplify an optical signal and extend a transmission distance of an optical signal.

It should be understood that FIG. 1 is merely an example for description, and this application is not limited thereto. For example, the fiber communication network may further include more optical components. For another example, embodiments of this application may be further applied to any scenario including a fiber amplifier.

For ease of understanding embodiments of this application, a fiber amplifier is first briefly described with reference to FIG. 2.

As shown in FIG. 2, the fiber amplifier may include, for example, but is not limited to: a pump laser, a wavelength division multiplexer (WDM), an isolator, and a gain fiber. The pump laser generates pump light, and the WDM may combine and send an input optical signal (or input signal light) and the pump light to the gain fiber. The gain fiber may be a fiber doped with a gain medium. In the gain fiber, pump light excites gain medium ions in the gain fiber to a high-energy level. After the input optical signal is input, the gain medium ions in the gain fiber transit from the high-energy level to a low-energy level, and stimulated radiation occurs. In this way, the input optical signal is amplified, and an output optical signal is obtained.

In the fiber amplifier, splicing is generally performed between the gain fiber and the WDM, and between the gain fiber and the isolator. In this way, a loss and a noise coefficient can be reduced. As shown in FIG. 2, a pigtail of the WDM is spliced with the gain fiber, and a pigtail of the isolator is spliced with the gain fiber.

In the fiber communication network, a gain fiber in a commonly used fiber amplifier is a quartz glass matrix erbium-doped fiber, and a pigtail of an optical component such as a WDM and an isolator is a quartz glass matrix fiber. To be specific, matrixes of the gain fiber and the pigtail of the optical component are the same. Both of the gain fiber and the pigtail of the optical component are quartz glass matrix fibers, and softening temperatures and refractive indexes of the two fibers are basically the same. Therefore, it is easy to splice pigtails and gain fibers of the WDM and isolator, and splicing performance is good. For example, when pigtails of a WDM and an isolator are spliced with a gain fiber, an insertion loss (that is, an insertion loss) may be less than 0.1 decibel (dBdB), and a return loss may be less than (−40 dB).

In some wide-spectrum fiber amplifiers, gain fibers of other matrixes may be used to improve a gain of an optical signal. For example, some soft glass fibers are used, such as a tellurium erbium-doped fiber (erbium-doped in a tellurite glass fiber) and a fluoride thulium-doped fiber (thulium-doped in a fluoride glass fiber). These gain fibers and quartz glass matrix fibers are difficult to splice, and performance indicators are poor.

For example, the gain fiber is a soft glass fiber, and a pigtail of an optical component such as a WDM and an isolator is a quartz glass matrix fiber. Softening temperatures of the soft glass fiber and the quartz glass matrix fiber are different. Therefore, during splicing, the soft glass fiber is softened, but the quartz glass matrix fiber is not. A splicing point of the soft glass fiber is deformed, and a splicing loss increases to 1 dB to 3 dB. In addition, a refractive index of the soft glass fiber is generally different from a refractive index of the quartz glass matrix fiber. For example, the refractive index of the quartz glass matrix fiber is about 1.47, and the refractive index of the soft glass fiber may be 2.0. When the foregoing two types of fibers are directly spliced in a horizontal plane, strong reflection occurs. Generally, the two fibers need to be spliced at an inclined angle. However, as shown in FIG. 3, when the soft glass fiber and the quartz glass matrix fiber are spliced at the inclined angle, refraction occurs on a splicing inclined plane because the refractive indexes of the soft glass fiber and the quartz glass matrix fiber are different. As a result, a spotsize mismatch of the two types of fibers is more serious, and an insertion loss increases. In addition, the quartz glass matrix fiber is not softened, but the soft glass fiber is softened. Consequently, fiber cores of the two types of fibers are more likely to shift longitudinally, and a splicing loss is increased.

In view of this, this application provides a low-cost and high-performance fiber amplifier formed by heterogeneous fibers. For example, when a gain fiber whose softening temperature or refractive index is different from a softening temperature and a refractive index of the quartz glass matrix fiber is used, the gain fiber may be interconnected with the quartz glass matrix fiber to form a fiber amplifier.

The following describes in detail embodiments provided in this application with reference to the accompanying drawings.

Figure 4:
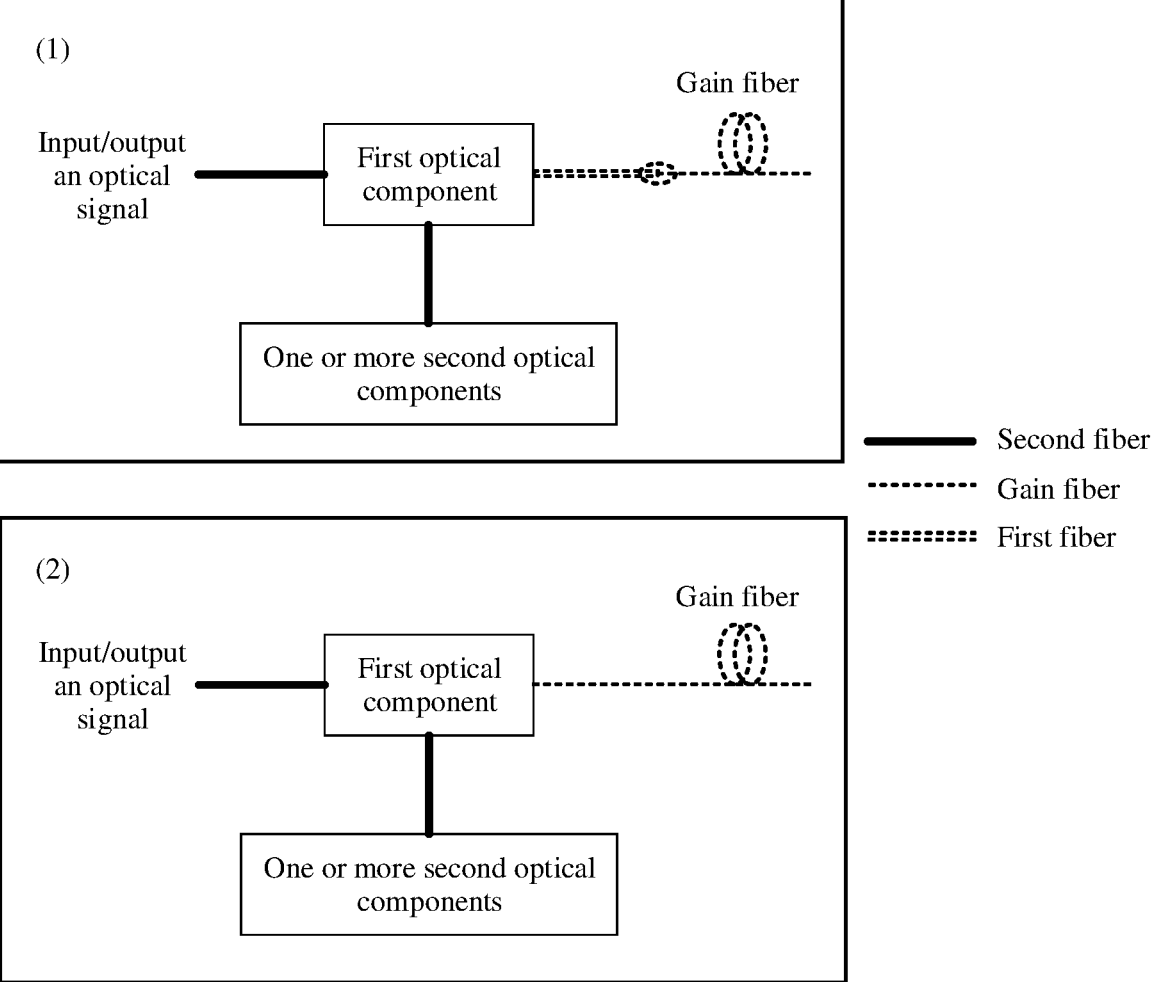
FIG. 4 is an example schematic diagram of a fiber amplifier according to an embodiment of this application.

FIG. 4 is a schematic diagram of a fiber amplifier according to an embodiment of this application.

The fiber amplifier may include a first optical component, one or more second optical components, and a gain fiber. It may be understood that the gain fiber may be configured to amplify an optical signal.

The first optical component is connected to the gain fiber, and the first optical component is connected to the gain fiber by using a first fiber or directly connected to the gain fiber.

The first optical component is connected to the one or more second optical components by using a second fiber, and/or the first optical component inputs/outputs an optical signal by using the second fiber (that is, inputs an optical signal or outputs an optical signal amplified by the gain fiber by using the second fiber).

Softening temperatures and/or refractive indexes of the first fiber and the second fiber are different, or softening temperatures and/or refractive indexes of the second fiber and the gain fiber are different.

In this embodiment of this application, that the first optical component is connected to the gain fiber includes at least the following two solutions.

Solution 1: The first optical component is connected to the gain fiber by using the first fiber, as shown in (1) in FIG. 4. Softening temperatures and/or refractive indexes of the first fiber and the second fiber are different.

Solution 2: The first optical component is directly connected to the gain fiber, as shown in (2) in FIG. 4. Softening temperatures and/or refractive indexes of the second fiber and the gain fiber are different. The first optical component is directly connected to the gain fiber. In other words, a pigtail connecting the first optical component to the gain fiber is the gain fiber, and there is no splicing point between the first optical component and the gain fiber.

The following describes the two solutions in detail.

The fiber amplifier formed by heterogeneous fibers provided in this embodiment of this application is denoted as a heterogeneous fiber amplifier below for brevity. A fiber that is of the optical component that forms the heterogeneous fiber amplifier and that connects to another optical component is different from a fiber that is of the optical component and that connects to the gain fiber. Therefore, the fiber amplifier provided in this application has high flexibility and high performance. In the foregoing solution 1, the first optical component in the heterogeneous fiber amplifier is connected to the gain fiber by using the first fiber, and the first optical component in the heterogeneous fiber amplifier is connected to another optical component, inputs an optical signal, or outputs an optical signal by using the second fiber. In the foregoing solution 2, the first optical component in the heterogeneous fiber amplifier is directly connected to the gain fiber. In other words, a pigtail connecting the first optical component to the gain fiber is the gain fiber, and there is no splicing point between the first optical component and the gain fiber. The first optical component in the heterogeneous fiber amplifier is connected to another optical component, inputs an optical signal, or outputs an optical signal by using the second fiber. In this manner, a fiber amplifier can be flexibly designed and used according to a requirement, and performance of the fiber amplifier can be improved. For example, in the foregoing solution 1, when splicing performance between the first fiber and the gain fiber needs to be improved, the first fiber may be designed as a fiber whose matrix is the same as or similar to a matrix of the gain fiber. Alternatively, the first fiber may be designed as a fiber having a smaller difference in a softening temperature and/or a refractive index from the gain fiber.

In a specific example, the first fiber may be a passive fiber whose matrix is the same as or similar to a matrix of the gain fiber, and the passive fiber is a fiber without a doped gain medium, or the first fiber is the gain fiber.

For example, based on the foregoing solution 1, in a possible implementation, the first fiber and the gain fiber are connected in a splicing manner. In other words, there is a splicing point between the first fiber and the gain fiber. In an actual design for fiber amplifiers, consistency of gain fibers of different batches is different. Therefore, a length of the gain fiber needs to be adjusted sometimes. The first fiber and the gain fiber are connected in a splicing manner, so that the length of the gain fiber can be conveniently adjusted. In addition, because the first fiber uses a fiber whose matrix is the same as or similar to the matrix of the gain fiber, or the first fiber is a fiber having a smaller difference in a softening temperature and/or a refractive index from the gain fiber, performance indicators of a loss and a return loss of splicing between the first fiber and the gain fiber are good.

For another example, based on the foregoing solution 2, it may be designed that the first optical component is directly connected to the gain fiber. To be specific, a pigtail connecting the first optical component to the gain fiber is the gain fiber, and there is no splicing point between the first optical component and the gain fiber. In the foregoing solution 2, in a possible implementation, the gain fiber is directly connected to or assembled into the first optical component. Because no splicing is required between the first optical component and the gain fiber, and there is no splicing point, compared with the foregoing solution 1, a heterogeneous fiber connection loss can be further reduced, and performance of the heterogeneous fiber amplifier (for example, performance of a gain and a noise coefficient) can be improved. Generally, in the foregoing solution 2, the first optical component is integrated with the gain fiber, and it is inconvenient to adjust the length of the gain fiber. Therefore, the solution 2 is suitable when consistency of the gain fiber is good. In other words, the foregoing solution 2 has a high requirement on the consistency of the gain fiber.

It should be understood that the first fiber and the second fiber are merely names for differentiation, and the names do not limit the protection scope of embodiments of this application.

Optionally, a difference between softening temperatures of the first fiber and the second fiber is greater than a difference between softening temperatures of the first fiber and the gain fiber; and/or a difference between refractive indexes of the first fiber and the second fiber is greater than a difference between refractive indexes of the first fiber and the gain fiber. The difference includes an absolute value of a difference, a relative value of an absolute value of a difference, and the like. For example, an absolute value of a difference between softening temperatures of the first fiber and the second fiber is greater than an absolute value of a difference between softening temperatures of the second fiber and the gain fiber; and/or an absolute value of a difference between refractive indexes of the first fiber and the second fiber is greater than an absolute value of a difference between refractive indexes of the first fiber and the gain fiber. The difference is not described in the following.

For example, a matrix of the first fiber is the same as or similar to a matrix of the gain fiber. For example, a softening temperature of a fiber connecting the first optical component to the gain fiber is the same as or similar to a softening temperature of the gain fiber, and an absolute value of a difference between softening temperatures of the first fiber and the second fiber is greater than an absolute value of a difference between softening temperatures of the first fiber and the gain fiber. In other words, a softening temperature of the second fiber is different from softening temperatures of the first fiber and the gain fiber.

In another example, a refractive index of the first fiber is the same as or similar to a refractive index of the gain fiber. For example, an absolute value of a difference between refractive indexes of the first fiber and the second fiber is greater than an absolute value of a difference between refractive indexes of the first fiber and the gain fiber. In this example, matrixes of any two of the first fiber, the second fiber, and the gain fiber may be the same or different.

It should be understood that in the solution 1, any first fiber that meets the following conditions is applicable to this embodiment of this application: A difference between softening temperatures or a difference between refractive indexes of the second fiber and the first fiber is greater than a difference between softening temperatures or a difference between refractive indexes of the first fiber and the gain fiber.

Specific forms of the first fiber, the gain fiber, and the second fiber are not limited in this embodiment of this application. Two types of fibers with different matrixes, for example, two types of fibers with different softening temperatures, or two types of fibers with different refractive indexes, are all applicable to this embodiment of this application.

In a possible design, the second fiber may be a quartz glass matrix fiber, and the first fiber or the gain fiber is a fiber of another matrix different from the quartz glass matrix fiber.

In still another possible design, the first fiber or the gain fiber may be a soft glass fiber, for example, a tellurium erbium-doped fiber (erbium-doped in a tellurite glass fiber), a fluoride thulium-doped fiber (thulium-doped in a fluoride glass fiber), or the first fiber or the gain fiber may be a fiber of another matrix different from the second fiber. This is not limited.

For example, in the following embodiments, the first fiber may be replaced with a soft glass fiber, and the second fiber may be replaced with a quartz glass matrix fiber.

The first optical component represents an optical component in a fiber amplifier.

Optionally, the first optical component may be one or more of a WDM, an isolator, or a fiber adapter.

In a possible design, the first optical component is the WDM.

Figure 5:
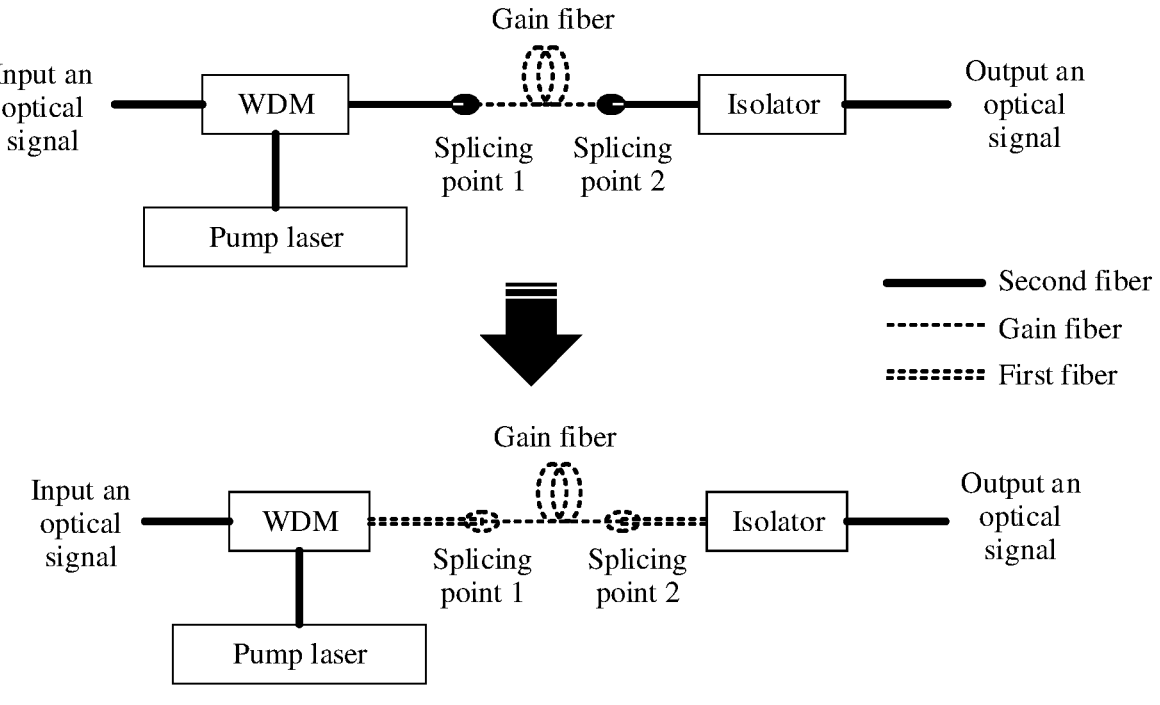
FIG. 5 is an example schematic diagram of a fiber amplifier applicable to an embodiment of this application.

The solution 1 is adopted. As shown in FIG. 5, a fiber connecting the WDM to the gain fiber is the first fiber, and a fiber connecting the WDM to a pump laser and a fiber connecting the WDM to a fiber through which an optical signal is input are the second fibers. A difference between softening temperatures of the first fiber and the second fiber is greater than a difference between softening temperatures of the first fiber and the gain fiber; and/or a difference between refractive indexes of the first fiber and the second fiber is greater than a difference between refractive indexes of the first fiber and the gain fiber. For example, a matrix of the first fiber is the same as or similar to a matrix of the gain fiber. To be specific, a matrix of the fiber connecting the WDM to the gain fiber is the same as or similar to the matrix of the gain fiber. In still another example, a glass structure of the first fiber is the same as or similar to a glass structure of the gain fiber. To be specific, a glass structure of the fiber connecting the WDM to the gain fiber is the same as or similar to the glass structure of the gain fiber. In still another example, the first fiber and the gain fiber are connected in a splicing manner. In other words, there is a splicing point between the first fiber and the gain fiber.

Figure 6:
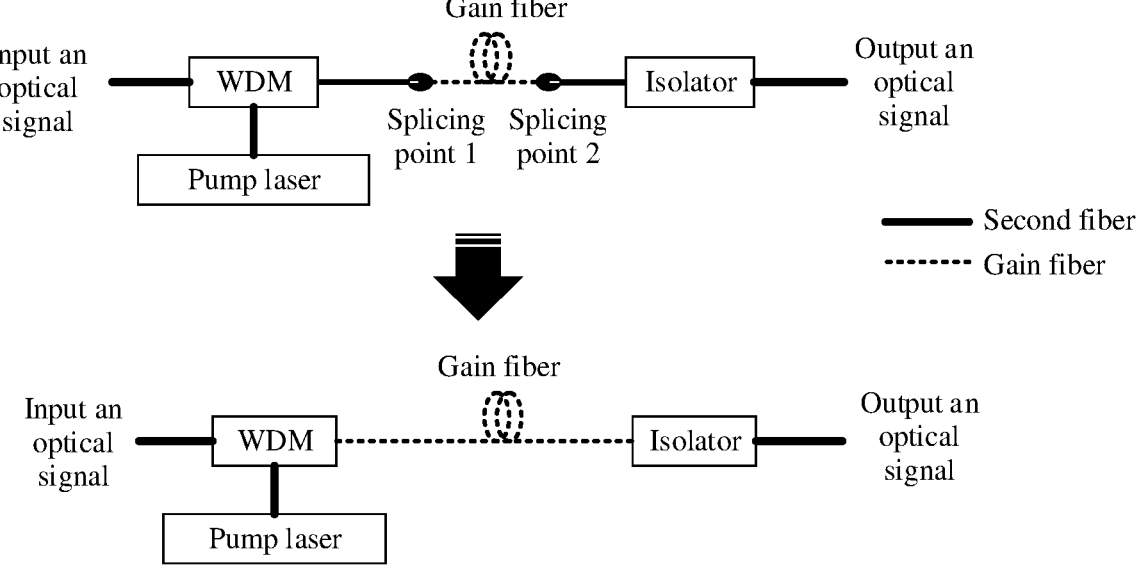
FIG. 6 is an example schematic diagram of a fiber amplifier applicable to still another embodiment of this application.

The solution 2 is adopted. As shown in FIG. 6, the WDM is directly connected to the gain fiber. In other words, the gain fiber is directly introduced or assembled into the WDM, and there is no splicing point between the WDM and the gain fiber. A fiber connecting the WDM to the pump laser and a fiber connecting the WDM to a fiber through which an optical signal is input are the second fibers.

In still another possible design, the first optical component is the isolator.

The solution 1 is adopted. As shown in FIG. 5, a fiber connecting the isolator to the gain fiber is the first fiber, and a fiber connecting the isolator to a fiber through which an optical signal (that is, an optical signal amplified by the gain fiber) is output is the second fiber. An absolute value of a difference between softening temperatures of the first fiber and the second fiber is greater than an absolute value of a difference between softening temperatures of the first fiber and the gain fiber; and/or an absolute value of a difference between refractive indexes of the first fiber and the second fiber is greater than an absolute value of a difference between refractive indexes of the first fiber and the gain fiber. For example, a matrix of the first fiber is the same as or similar to a matrix of the gain fiber. To be specific, a matrix of the fiber connecting the isolator to the gain fiber is the same as or similar to the matrix of the gain fiber. In still another example, a glass structure of the first fiber is the same as or similar to a glass structure of the gain fiber. To be specific, a glass structure of the fiber connecting the WDM to the gain fiber is the same as or similar to the glass structure of the gain fiber. In still another example, the first fiber and the gain fiber are connected in a splicing manner. In other words, there is a splicing point between the first fiber and the gain fiber.

The solution 2 is adopted. As shown in FIG. 6, the isolator is directly connected to the gain fiber. In other words, the gain fiber is directly introduced or assembled into the isolator, and there is no splicing point between the isolator and the gain fiber. A fiber connecting the isolator to a fiber through which an optical signal is output is the second fiber.

In still another possible design, the first optical component is the fiber adapter.

Figure 7:
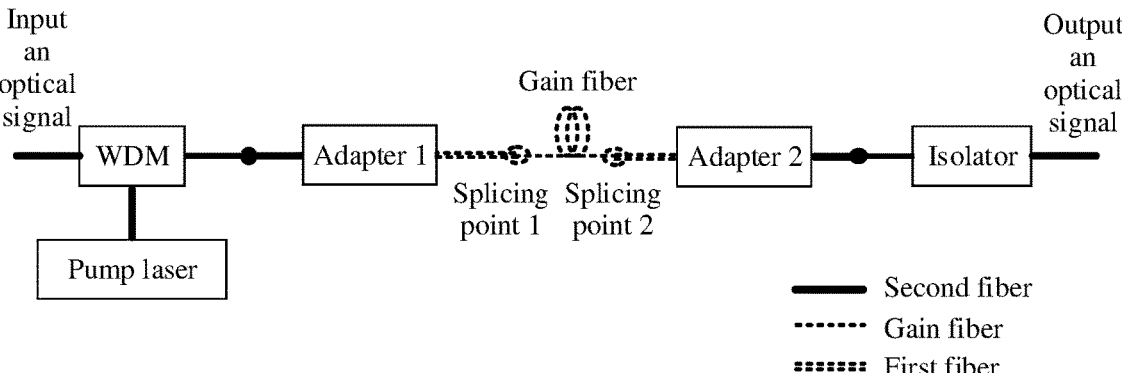
FIG. 7 is an example schematic diagram of a fiber amplifier applicable to another embodiment of this application.

The solution 1 is adopted. As shown in FIG. 7, a fiber connecting the fiber adapter (for example, an adapter 1 and/or an adapter 2) to the gain fiber is the first fiber, and a fiber connecting the fiber adapter to the isolator or the WDM is the second fiber. A difference between softening temperatures of the first fiber and the second fiber is greater than a difference between softening temperatures of the first fiber and the gain fiber; and/or a difference between refractive indexes of the first fiber and the second fiber is greater than a difference between refractive indexes of the first fiber and the gain fiber. For example, a matrix of the first fiber is the same as or similar to a matrix of the gain fiber. To be specific, a matrix of the fiber connecting the fiber adapter to the gain fiber is the same as or similar to the matrix of the gain fiber. In still another example, a glass structure of the first fiber is the same as or similar to a glass structure of the gain fiber. To be specific, a glass structure of the fiber connecting the WDM to the gain fiber is the same as or similar to the glass structure of the gain fiber. In still another example, the first fiber and the gain fiber are connected in a splicing manner. In other words, there is a splicing point between the first fiber and the gain fiber.

Figure 8:
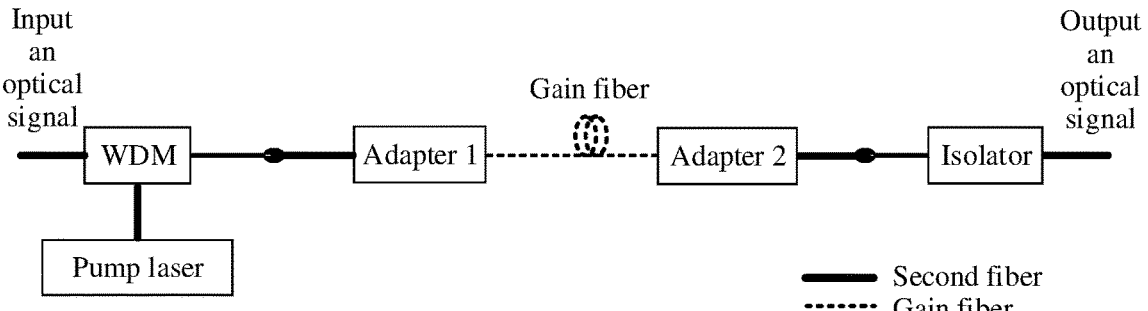
FIG. 8 is an example schematic diagram of a fiber amplifier applicable to still another embodiment of this application.

The solution 2 is adopted. As shown in FIG. 8, a fiber adapter (for example, an adapter 1 and an adapter 2) is directly connected to the gain fiber. In other words, the gain fiber is directly introduced or assembled into the fiber adapter, and there is no splicing point between the fiber adapter and the gain fiber. A fiber connecting the fiber adapter to the isolator or the WDM is the second fiber.

It should be understood that FIG. 5 to FIG. 8 are all examples for description, and this embodiment of this application is not limited thereto. For example, a quantity of fiber adapters is not limited in this embodiment of this application. For example, FIG. 7 or FIG. 8 may also include one fiber adapter, for example, include only the adapter 1 or the adapter 2. For still another example, neither a form nor a quantity of improved optical components is limited in this embodiment of this application. For example, in FIG. 5, only a fiber connecting the WDM or the isolator to the gain fiber may be the first fiber. For another example, in FIG. 6, only a fiber connecting the WDM or the isolator to the gain fiber may be the gain fiber.

The following describes the foregoing the solution 1 and the solution 2 in detail.

The solution 1: The first optical component is connected to the gain fiber by using the first fiber.

Optionally, the first fiber and the gain fiber may be connected in a splicing manner.

The first optical component is connected to the gain fiber by using the first fiber, that is, it indicates that a pigtail connecting the first optical component to the gain fiber is the first fiber. In a possible implementation, the first optical component includes at least one capillary tube (or a fiber connector), and the at least one capillary tube (or fiber a connector) is configured to: introduce or assemble, into the first optical component, the first fiber from which a coating layer is stripped.

The first optical component is configured to perform one or more of the following operations by using the second fiber: connect to another optical component (that is, one or more second optical components), input an optical signal, and output an optical signal (for example, an optical signal amplified by the gain fiber). In a possible implementation, the first optical component includes at least one capillary tube, and the at least one capillary tube is configured to introduce or assemble, into the first optical component, the second fiber from which a coating layer is stripped.

It should be understood that the first optical component includes at least one capillary tube, where the at least one capillary tube is configured to introduce, into the first optical component, the first fiber from which a coating layer is stripped, and a transmission direction of an optical signal in the first fiber is not limited. The first fiber may be configured to: input an optical signal, output an optical signal, and input and output optical signals at the same time. Similarly, the first optical component includes at least one capillary tube, where the at least one capillary tube is configured to introduce, into the first optical component, the second fiber from which a coating layer is stripped is introduced, and a transmission direction of an optical signal in the second fiber is not limited. The second fiber may be configured to: input an optical signal, output an optical signal, and input and output optical signals at the same time.

It should be further understood that the capillary tube through which the first fiber is introduced into the first optical component and the capillary tube through which the second fiber is introduced into the first optical component may be a same capillary tube. For example, the first fiber and the second fiber are introduced into the first optical component through a two-fiber capillary tube (or referred to as a double-fiber capillary tube, or a double-fiber connector). Alternatively, the first fiber and the second fiber may be introduced into the first optical component through different capillary tubes. For example, the first fiber and the second fiber are respectively introduced into the first optical component through two one-fiber capillary tubes (or referred to as a single-fiber capillary tube, or referred to as a single-fiber connector).

A difference between softening temperatures or refractive indexes of the second fiber and the first fiber is greater than a difference between softening temperatures or refractive indexes of the first fiber and the gain fiber. In other words, a difference between softening temperatures or refractive indexes of a fiber connecting another optical component (for example, denoted as a second optical component) to the first optical component, or a fiber that is of the first optical component and through which an optical signal is input/ output and a fiber connecting the first optical component to the gain fiber is greater than a difference between softening temperatures or refractive indexes of a fiber connecting the first optical component to the gain fiber and the gain fiber.

An optical signal input by the first optical component by using the second fiber arrives at the first fiber through at least a section of free space, or an optical signal input by the first optical component by using the first fiber arrives at the second fiber through at least a section of free space. In other words, an optical signal transmitted in a fiber connecting the first optical component to another optical component or a fiber through which an optical signal is input arrives, through at least a section of space in the first optical component, at a fiber (that is, the first fiber) connecting the first optical component to the gain fiber. Alternatively, an optical signal transmitted in a fiber connecting the first optical component to the gain fiber arrives, through at least a section of space in the optical component, at a fiber (that is, the second fiber) connecting the first optical component to another optical component or a fiber through which an optical signal is output.

The WDM or the isolator is used as an example. In a possible design, a pigtail connecting the WDM or the isolator to the gain fiber may be replaced with the first fiber (for example, a fiber whose matrix is the same as or similar to a matrix of the gain fiber), to form a fiber amplifier formed by heterogeneous fibers.

In a first example, as shown in FIG. 5, the fiber amplifier may include a WDM, a pump laser, an isolator, and a gain fiber. A conventional heterogeneous fiber amplifier is improved, to obtain an improved heterogeneous fiber amplifier.

For example, a matrix of the first fiber is the same as or similar to a matrix of the gain fiber. For example, a pigtail connecting the WDM and/or the isolator to the gain fiber may be replaced with the first fiber. A fiber connecting the WDM to the pump laser, a fiber connecting the WDM to a fiber through which an optical signal is input, and a fiber connecting the isolator to a fiber through which an optical signal (that is, an optical signal amplified by the gain fiber) is output are the second fibers.

For another example, a difference between softening temperatures or refractive indexes of a fiber (that is, the second fiber) through which the WDM introduces an input optical signal and a fiber (that is, the first fiber) connecting the WDM to the gain fiber is greater than a difference between softening temperatures or refractive indexes of a fiber connecting the WDM to the gain fiber and the gain fiber.

For another example, a difference between softening temperatures or refractive indexes of a fiber (that is, the second fiber) connecting the WDM to the pump laser and a fiber (that is, the second fiber) connecting the WDM to the gain fiber is greater than a difference between softening temperatures or refractive indexes of a fiber (that is, the second fiber) connecting the WDM to the gain fiber and the gain fiber.

For another example, a difference between softening temperatures of a fiber (that is, the second fiber) through which the isolator outputs an optical signal and a fiber (that is, the first fiber) connecting the isolator to the gain fiber is greater than a difference between softening temperatures of a fiber connecting the isolator to the gain fiber and the gain fiber.

For the WDM shown in FIG. 5, refer to the WDM shown in FIG. 9 in the following; and/or for the isolator shown in FIG. 5, refer to the isolator shown in FIG. 14 in the following.

In a second example, as shown in FIG. 7, the fiber amplifier may include a WDM, a pump laser, an isolator, one or more fiber adapters, and a gain fiber. In this example, one or more fiber adapters may be added, for example, an adapter 1 and an adapter 2. Specifically, pigtails connecting the adapter 1 and the adapter 2 to the gain fiber may be replaced with the first fiber (for example, a fiber whose matrix is the same as or similar to a matrix of the gain fiber). Both of a fiber connecting the adapter 1 to the WDM and a fiber connecting the adapter 2 to the isolator are the second fibers.

For example, a matrix of the first fiber is the same as or similar to the matrix of a gain fiber. For example, a pigtail connecting the adapter 1 and/or the adapter 2 to the gain fiber may be replaced with the first fiber. A fiber connecting to the WDM to the adapter 1 and a fiber connecting the isolator to the adapter 2 are still the second fibers.

For another example, a difference between softening temperatures of a fiber (that is, the second fiber) connecting the adapter 1 to the WDM and a fiber (that is, the first fiber) connecting the adapter 1 to the gain fiber is greater than a difference between softening temperatures of a fiber connecting the adapter 1 to the gain fiber and the gain fiber.

For another example, a difference between softening temperatures of a fiber connecting the adapter 2 to the isolator and a fiber connecting the adapter 2 to the gain fiber is greater than a difference between softening temperatures of a fiber connecting the adapter 2 to the gain fiber and the gain fiber.

Both of the conventional WDM and the isolator are applicable to the fiber amplifier shown in FIG. 7.

The solution 2: The first optical component is directly connected to the gain fiber, and there is no splicing point between the first optical component and the gain fiber.

The first optical component is directly connected to the gain fiber, that is, a pigtail connecting the first optical component to the gain fiber is directly the gain fiber. Therefore, there is no splicing point between the first optical component and the gain fiber. In a possible implementation, the first optical component includes at least one capillary tube (or a fiber connector), and the at least one capillary tube (or fiber connector) is configured to introduce or assemble, into the first optical component, the gain fiber from which a coating layer is stripped.

The first optical component is configured to perform one or more of the following operations by using the second fiber: connect another optical component (for example, denoted as a second optical component), input an optical signal, and output an optical signal (for example, an optical signal amplified by the gain fiber). In a possible implementation, the first optical component includes at least one capillary tube, and the at least one capillary tube is configured to introduce or assemble, into the first optical component, the second fiber from which a coating layer is stripped.

It should be understood that the first optical component includes at least one capillary tube, where the at least one capillary tube is configured to introduce, into the first optical component, the gain fiber from which a coating layer is stripped, and a transmission direction of an optical signal in the gain fiber is not limited. The gain fiber may be configured to: input an optical signal, output an optical signal, and input and output optical signals at the same time. Similarly, the first optical component includes at least one capillary tube, where the at least one capillary tube is configured to introduce, into the first optical component, the second fiber from which a coating layer is stripped, and a transmission direction of an optical signal in the second fiber is not limited. The second fiber may be configured to: input an optical signal, output an optical signal, and input and output optical signals at the same time.

It should be further understood that the capillary tube through which the gain fiber is introduced into the first optical component and the capillary tube through which the second fiber is introduced into the first optical component may be a same capillary tube. For example, the gain fiber and the second fiber are introduced into the first optical component through a two-fiber capillary tube (or referred to as a double-fiber capillary tube or a double-fiber connector). Alternatively, the gain fiber and the second fiber may be introduced into the first optical component through different capillary tubes. For example, the gain fiber and the second fiber are respectively introduced into the first optical component through two one-fiber capillary tubes (or referred to as a single-fiber capillary tube or a single-fiber connector).

Softening temperatures or refractive indexes of a fiber connecting the first optical component to another optical component or a fiber (that is, the second fiber) through which an optical signal is input/output and the gain fiber are different.

An optical signal input by the first optical component by using the second fiber arrives at the gain fiber through at least a section of free space, or an optical signal input by the first optical component by using the gain fiber arrives at the second fiber through at least a section of free space. In other words, an optical signal transmitted in a fiber connecting the first optical component to another optical component or a fiber through which an optical signal is input/output arrives, through at least a section of space in the optical component, at the gain fiber. Alternatively, an optical signal transmitted in the gain fiber arrives, through at least a section of space in the first optical component, a fiber (that is, the second fiber) connecting the first optical component to another optical component or a fiber through which an optical signal is input/output.

The WDM or the isolator is used as an example. A pigtail connecting the WDM or isolator to the gain fiber may be replaced with the gain fiber, to form a fiber amplifier formed by heterogeneous fibers.

In a first example, as shown in FIG. 6, the fiber amplifier may include a WDM, a pump laser, an isolator, and a gain fiber. A conventional heterogeneous fiber amplifier is improved, to obtain an improved heterogeneous fiber amplifier. Specifically, a pigtail connecting the WDM to the gain fiber and a pigtail connecting the isolator to the gain fiber may be directly replaced with the gain fiber. A fiber connecting the WDM to the pump laser, a fiber through which the WDM inputs an optical signal, and a fiber through which the isolator outputs an optical signal are all the second fibers.

As described above, the first optical component is directly connected to the gain fiber, and softening temperatures or refractive indexes of a fiber connecting the first optical component to another optical component or a fiber through which an optical signal is input/output and the gain fiber are different.

For example, the WDM and/or the isolator is directly connected to the gain fiber.

For another example, softening temperatures or refractive indexes of a fiber (that is, the second fiber) through which the WDM introduces an input optical signal and the gain fiber are different.

For another example, softening temperatures or refractive indexes of a fiber (that is, the second fiber) connecting the WDM to the pump laser and the gain fiber are different.

For another example, softening temperatures or refractive indexes of a fiber (that is, the second fiber) through which the isolator outputs an optical signal and the gain fiber are different.

For the WDM shown in FIG. 6, refer to the WDM shown in FIG. 9 in the following; and/or for the isolator shown in FIG. 6, refer to the isolator shown in FIG. 14 in the following.

In a second example, as shown in FIG. 8, the fiber amplifier may include a WDM, a pump laser, an isolator, one or more fiber adapters, and a gain fiber. In this example, one or more fiber adapters may be added, for example, an adapter 1 and an adapter 2. Specifically, pigtails connecting the adapter 1 and the adapter 2 to the gain fiber may be directly replaced with the gain fiber. Both of a fiber connecting the adapter 1 to the WDM and a fiber connecting the adapter 2 to the isolator are the second fibers.

As described above, the first optical component is directly connected to the gain fiber, and softening temperatures or refractive indexes of a fiber connecting the first optical component to another optical module or a fiber through which an optical signal is input/output and the gain fiber are different.

For example, the adapter 1 or the adapter 2 may be directly connected to the gain fiber.

For another example, softening temperatures of a fiber (that is, the second fiber) connecting the WDM to the adapter 1 and the gain fiber are different.

For another example, softening temperatures of a fiber (that is, the second fiber) connecting the isolator to the adapter 2 and the gain fiber are different.

Both of the conventional WDM and the isolator are applicable to the fiber amplifier shown in FIG. 8.

It should be understood that the foregoing describes solution 1 and solution 2 with reference to FIG. 5 to FIG. 8, and this embodiment of this application is not limited thereto. For example, the solution 1 and the solution 2 may be further used in combination. For example, as shown in FIG. 5 to FIG. 8, the solution 1 is used for some optical components, and the solution 2 is used for some optical components. As shown in FIG. 5 or FIG. 6, a fiber connecting the WDM to the gain fiber is the first fiber, and the isolator is directly connected to the gain fiber (or the gain fiber is directly introduced into or assembled into the isolator).

It should be further understood that the foregoing solution 1 and solution 2 are merely examples for description, and this embodiment of this application is not limited thereto. For example, the first fiber may also be a fiber whose softening temperature or refractive index is similar to a softening temperature or a refractive index of the gain fiber.

According to the heterogeneous fiber amplifier provided in this embodiment of this application, a matrix of a fiber connecting to the gain fiber is the same as or similar to a matrix of the gain fiber. Therefore, the heterogeneous fiber amplifier provided in this embodiment of this application can greatly reduce a heterogeneous fiber connection loss. Heterogeneous fiber connection is commonly required to amplify an optical signal at an L band and an S band. Because optical transmission spectral efficiency (spectrum effectiveness, SE) is close to the Shannon limit, an important solution to improve a fiber transmission capacity is to expand an available spectrum from a C band to the L band and the S band. To achieve a gain similar to a gain of amplifying an optical signal at the C band, gain fibers for amplifying optical signals at the L band and the S band generally use a fiber with a matrix different from the quartz glass matrix. However, a fiber on a line is a quartz glass matrix fiber, and pigtails of optical components such as a WDM and an isolator in a conventional optical amplifier module are also quartz glass matrix fibers. Therefore, an optical signal at the L/S band can be amplified through heterogeneous fiber connection.

(1) As described above, in this embodiment of this application, a heterogeneous fiber connection loss is similar to a loss caused by splicing of quartz glass matrix fibers in a conventional optical amplifier (that is, a fiber amplifier). According to the heterogeneous fiber amplifier provided in this embodiment of this application, a heterogeneous fiber connection loss is similar to a fiber connection loss of a homogeneous fiber amplifier, for example, similar to a splicing loss of quartz glass matrix fibers in a conventional fiber amplifier. A splicing loss of the quartz glass matrix fiber is about 0.1 dB. If heterogeneous fibers are directly spliced, a loss reaches 0.5 dB to 1 dB. Theoretically, a loss of the heterogeneous fiber amplifier provided in this embodiment of this application can also reach a value close to 0.1 dB. Especially, if the first optical component is directly connected to the gain fiber, a splicing loss is even lower than a splicing loss of the quartz glass matrix fiber.

(2) After the heterogeneous fiber connection loss is reduced, a gain of the fiber amplifier can be increased accordingly. It is assumed that the fiber amplifier has four connection points, a gain of the fiber amplifier can be increased by 1.6 dB to 3.6 dB. One of the major problems of amplifying an optical signal at the L/S band is that a gain is low. Therefore, it is important for the gain of amplifying an optical signal at the L/S band to increase by 1.6 dB to 3.6 dB.

(3) After the heterogeneous fiber connection loss is reduced, a noise coefficient of the fiber amplifier can be reduced. Especially, a connection loss of a part before the gain fiber, that is, as shown in FIG. 5, a part from a fiber through which an optical signal is input to the gain fiber, greatly affects the noise coefficient of the fiber amplifier. For example, according to the heterogeneous fiber amplifier provided in this embodiment of this application, compared with a conventional heterogeneous fiber splicing solution, a noise coefficient of the fiber amplifier can be reduced by 0.4 dB to 0.9 dB. Another major problem of amplifying an optical signal at the L/S band is that a noise coefficient is high. Therefore, the heterogeneous fiber amplifier provided in this embodiment of this application is very important for amplifying the optical signal at the L/S band.

(3) Fibers of different matrixes have different softening temperatures. Therefore, it is difficult to splice heterogeneous fibers, a failure probability is high, and costs are high. According to this embodiment of this application, homogeneous fiber splicing may be performed. Therefore, processing difficulty is low, and costs are low.

Therefore, according to the optical amplifier module (including at least one first optical component) formed by heterogeneous fibers provided in this embodiment of this application, a heterogeneous fiber connection loss can be minimized. This increases a gain of the fiber amplifier, reduces a noise coefficient, processing difficulty, and costs. The heterogeneous fiber amplifier is expected to become an essential technology for amplifying an optical signal at the L/S band.

The foregoing describes the fiber amplifier provided in this embodiment of this application, and the following describes optical components that may constitute the fiber amplifier. It should be understood that the optical components described in the following may be used separately, may be used in combination, or may be used in the fiber amplifiers shown in FIG. 4 to FIG. 8.

Figure 9:
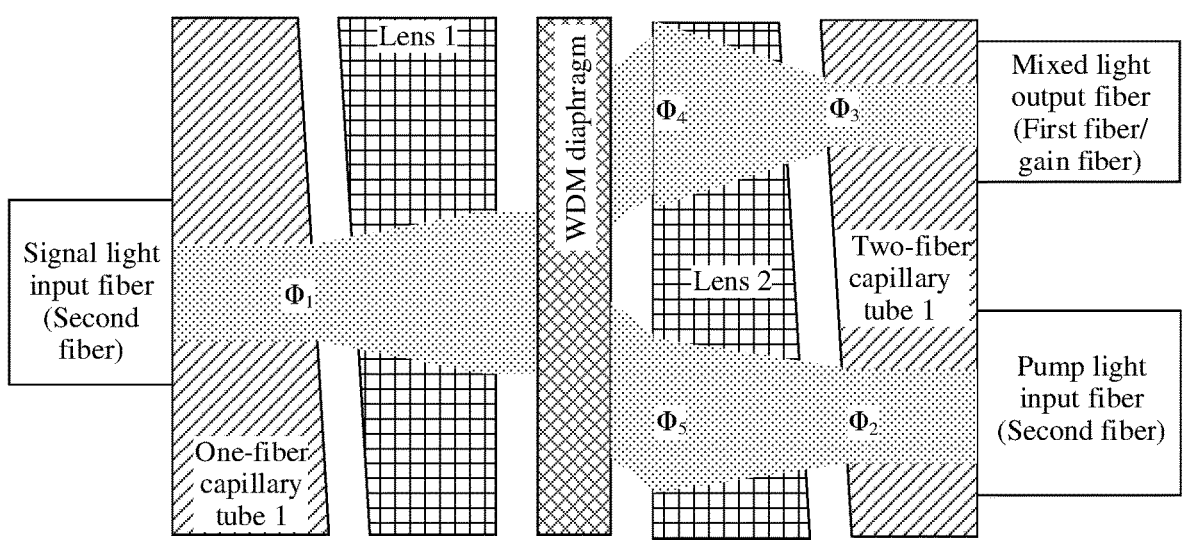
FIG. 9 is an example schematic diagram of a WDM applicable to an embodiment of this application.

Refer to FIG. 9. A WDM applicable to embodiments of this application is described. The WDM may be the first optical component in the embodiment in FIG. 4. The WDM shown in FIG. 9 may be used in the fiber amplifiers shown in FIG. 4 to FIG. 8.

FIG. 9 is a schematic diagram of a WDM applicable to an embodiment of this application. The WDM may include one or more lenses, for example, a lens 1 and a lens 2. The WDM may further include a WDM diaphragm, a one-fiber capillary tube (for example, a one-fiber capillary tube 1), and a two-fiber capillary tube (for example, a two-fiber capillary tube 1).

The one-fiber capillary tube may also be referred to as a single-fiber capillary tube. A person skilled in the art should understand a meaning of the one-fiber capillary tube. For example, the one-fiber capillary tube may also be replaced with a single-fiber connector. The two-fiber capillary tube may also be referred to as a double-fiber capillary tube. A person skilled in the art should understand a meaning of the two-fiber capillary tube. For example, the two-fiber capillary tube may also be replaced with a double-fiber connector. One-fiber capillary tubes and two-fiber capillary tubes are used for uniformity in the following.

Optionally, a WDM of a spatial optical path may be used in this embodiment of this application. The WDM is used, so that a splicing problem caused by softening temperatures of fiber glasses with different matrixes can be avoided. Alternatively, another type of WDM may be used. This is not limited.

A WDM module may be configured to implement a function of combining or multiplexing signal light and pump light. As shown in FIG. 9, the signal light is sent to the WDM diaphragm through the second fiber, and the pump light is also sent to the WDM diaphragm through the second fiber. The WDM diaphragm may complete combination or multiplexing of the signal light and the pump light, to form mixed light. It should be understood that the mixed light is merely a name for differentiation, and the mixed light may also be referred to as multiplexed light. The name of the mixed light does not limit the protection scope of embodiments of this application. The mixed light is used for description in the following.

FIG. 9 is used as an example. A possible procedure is described as follows.

(1) A one-fiber capillary tube 1 inputs an optical signal from the second fiber (that is, a signal light input fiber), and sends the optical signal to the lens 1. It may be understood that the input optical signal is a general optical signal, that is, it indicates that an optical signal is introduced, led, or input. In other words, an optical signal input by the second fiber is the signal light.

In a possible implementation, a coating layer may be stripped from the second fiber, the second fiber is inserted into the capillary tube, and then the second fiber is ground into an inclined plane and coated.

(2) The lens 1 mainly collimates a light beam (herein, a light beam of the signal light) of the optical signal sent by the one-fiber capillary tube 1.

The one-fiber capillary tube 1 sends the signal light to the space, and the signal light diverges in the space. Therefore, after the signal light is collimated by the lens 1, the signal light may be converted into parallel light or approximately parallel light.

(3) The WDM diaphragm mainly implements multiplexing or combination of the signal light sent by the lens 1 and the pump light sent by the lens 2.

Figure 10:
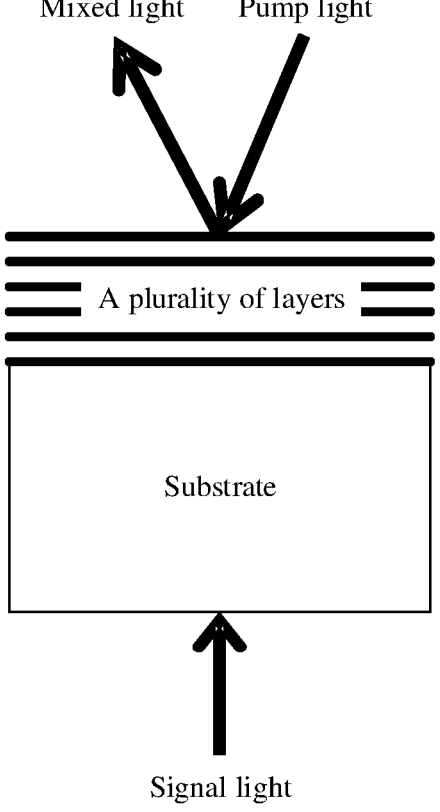
FIG. 10 is an example schematic diagram of a diaphragm applicable to a spatial WDM according to an embodiment of this application.

A possible implementation is shown in FIG. 10. A substrate is coated with a plurality of layers of films, the pump light sent by the lens 2 is incident through the plurality of layers of films, the signal light sent by the lens 1 is incident through the substrate, and the mixed light generated after multiplexing is emitted to the lens 2 through the plurality of layers of films.

It should be understood that the foregoing procedure is merely an example for description, and this embodiment of this application is not limited thereto. Actually, the pump light may also be sent through the one-fiber capillary tube 1, and the signal light may be sent through the two-fiber capillary tube 1. In addition, the WDMs in FIG. 5 and FIG. 6 are a WDM configured to provide forward pumping. Actually, the WDM may also be configured to provide backward pumping. This is not limited in this embodiment of this application. When the WDM is used to provide backward pumping, a structure of the WDM is similar to a structure of a WDM that provides forward pumping (see FIG. 9). The signal light is output, the pump light is input, and the mixed light is input and output. Working principles of a WDM that provides forward pumping and a WDM that provides backward pumping are similar. Therefore, the implementation solutions of the two WDMs are similar.

In this embodiment of this application, a mixed light output fiber in the WDM is the first fiber (the solution 1) or the gain fiber (the solution 2), and a signal light input fiber and a pump light input fiber are the second fibers.

For the first fiber and the second fiber, refer to the foregoing descriptions.

Optionally, light beams of the mixed light and the pump light may be adjusted or collimated in any one of the following manners.

Manner 1: Adjust an included angle between two fibers in a two-fiber capillary tube, so that the two fibers in the two-fiber capillary tube are not parallel, to facilitate collimation of light beams of the pump light and the mixed light.

Refer to FIG. 9. It can be learned that the WDM in FIG. 9 is a WDM that supports forward pumping, and main functions of the two-fiber capillary tube 1 include: introducing pump light from a pump light input fiber (that is, the second fiber), sending the pump light to the lens 2, receiving mixed light sent from the lens 2, and sending the mixed light to a mixed light output fiber (the first fiber or the gain fiber). Alternatively, main functions of the two-fiber capillary tube 1 include: introducing signal light from a signal light input fiber (that is, the second fiber), sending the signal light to the lens 2, receiving mixed light sent from the lens 2, and sending the mixed light to the mixed light output fiber. If the WDM is a WDM that supports backward pumping, main functions of the two-fiber capillary tube 1 include: introducing pump light from a pump light input fiber (that is, the second fiber) and sending the pump light to the lens 2. In addition, some of mixed light sent from the lens 2 to a mixed light output fiber (the first fiber or the gain fiber) is sent from the lens 2 to a mixed light output fiber, and some of the mixed light is sent from the mixed light output fiber to the lens 2. In this case, the "mixed light output fiber" is only a name and does not represent an optical signal transmission direction in a fiber. Alternatively, main functions of the two-fiber capillary tube 1 include: introducing signal light from the signal light input fiber (that is, the second fiber) and sending the signal light to the lens 2. In addition, some of the mixed light sent from the lens 2 to the mixed light output fiber (the first fiber or the gain fiber) is sent from the lens 2 to the mixed light output fiber, and some of the mixed light is sent from the mixed light output fiber to the lens 2. In this case, the "mixed light output fiber" is only a name and does not represent an optical signal transmission direction in a fiber.

For example, the included angle between the two fibers in the two-fiber capillary tube (that is, the two-fiber capillary tube 1) may be designed according to a refractive index of the first fiber or the gain fiber, to facilitate collimation of a light beam of the mixed light.

For example, an included angle between the mixed light output fiber (the first fiber or the gain fiber) and the pump light input fiber/signal light input fiber (the second fiber) may be adjusted according to a refraction principle and a refractive index of the mixed light output fiber (the first fiber or the gain fiber), so that a mixed light beam is aligned with a corresponding location in the WDM diaphragm.

Figure 11:
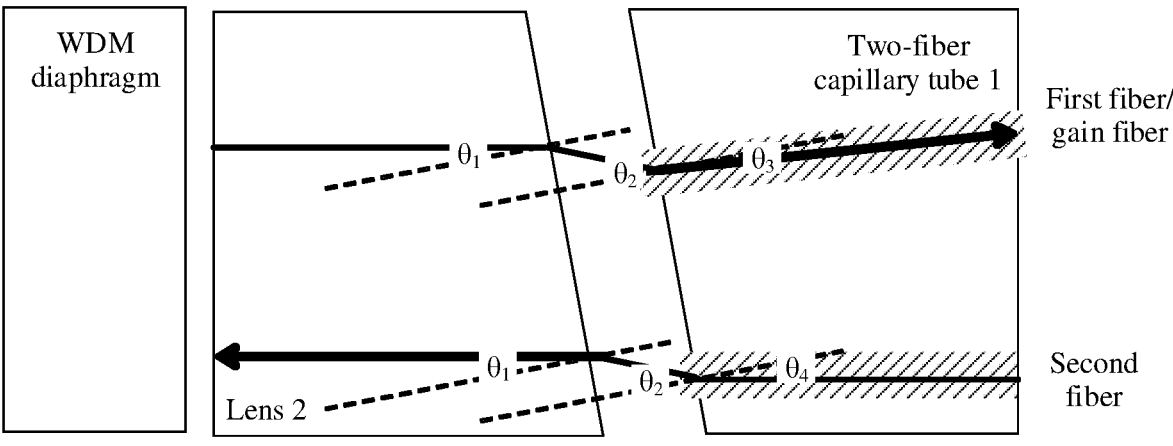
FIG. 11 is an example schematic diagram of adjusting an included angle between two fibers in a two-fiber capillary tube applicable to an embodiment of this application.

As shown in FIG. 11, an included angle between the first fiber/gain fiber and the second fiber in the two-fiber capillary tube 1 is $\Delta\theta=\theta4-\theta3$. It is assumed that a refractive index of the first fiber/gain fiber is n1, and a refractive index of the second fiber is n2. Generally, two light beams are parallel in the lens, that is, refraction angles $\theta1$ of the two light beams passing through free space to the lens are the same. It is assumed that refractive indexes of all parts in the lens are the same, refraction angles of the two light beams from the lens 2 to the free space and refraction angles $\theta2$ from the free space to the two-fiber capillary tube are the same. In this case, according to the refraction law, $\sin\theta2=n1*\sin\theta3=n2*\sin\theta4$. During design, $\theta2$ may be set based on an optimal incident angle/emergent angle of the WDM diaphragm, structures and optical parameters of the WDM diaphragm, the lens, and the two-fiber capillary tube, and the like. In this way, the included angle between the first fiber/gain fiber and the second fiber in the two-fiber capillary tube 1 may be calculated according to the foregoing formula.

Manner 2: Light beams of optical signals in two fibers in a two-fiber capillary tube are adjusted by using a lens. For example, light spots or spotsizes of optical signals input or output by the two fibers in the two-fiber capillary tube are adjusted by using the lens, to facilitate collimation of light beams of the pump light and the mixed light, and/or align light spots or spotsizes (including a size of the light spot or the spotsize, and/or a divergence angle of the light spot or the spotsize, and the like) of the optical signals in the two fibers in the two-fiber capillary tube on the WDM diaphragm.

The lens may mainly collimate a spatial optical path, and may also adjust a light spot or a spotsize of a light beam. For example, light beams with different diameters and/or different divergence angles are collimated until the light beams are parallel (or approximately parallel) with the same or similar size of light spots or spotsizes. In this embodiment of this application, the lens (namely, the lens 2 in FIG. 9) may be a lens that supports dual light paths.

Figure 12:
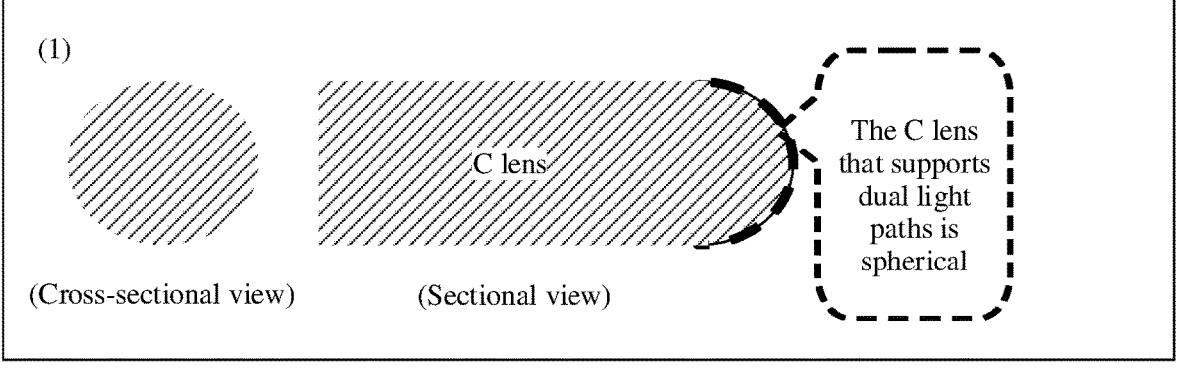
FIG. 12 and FIG. 13 are example schematic diagrams of lenses applicable to embodiments of this application.
Figure 12:
Figure 12:
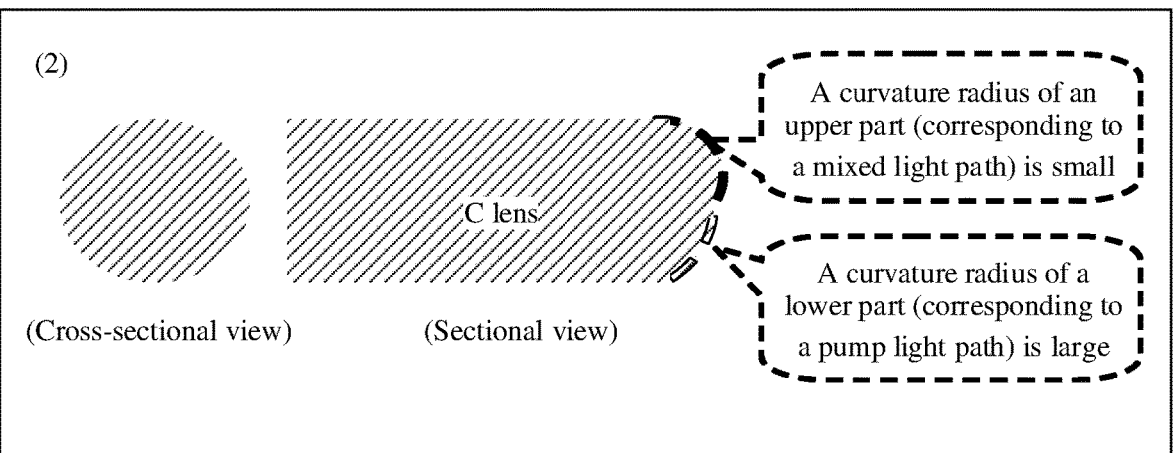

In a possible design, as shown in FIG. 12, an aspheric C lens may be used.

A curvature radius of an upper half part of the C lens (that is, the lens 2 in FIG. 9) is small, and a curvature radius of a lower half part of the C lens is large. In other words, a curvature radius of a mixed light path corresponding to the C lens (that is, corresponding to the first fiber or the gain fiber) is less than a curvature radius of a pump light path corresponding to the C lens (that is, corresponding to the second fiber). Compared with a conventional spherical C lens that supports dual light paths, the C lens provided in this embodiment of this application is more flexible and can be applied in a large quantity of application scenarios.

It should be understood that in the C lens, a value of a curvature radius is relative, that is, a curvature radius of an upper part of the C lens is relatively small compared with a curvature radius of a lower part of the C lens. Values of a curvature radius of an upper part and a curvature radius of a lower part are not limited.

It should be further understood that, in the C lens, a part occupied by a curved surface with a small curvature radius and a part occupied by a curved surface with a large curvature radius are not limited. This embodiment of this application is applicable provided that a curvature radius of a mixed light path corresponding to the C lens is less than a curvature radius of a pump light path corresponding to the C lens.

Figure 13:
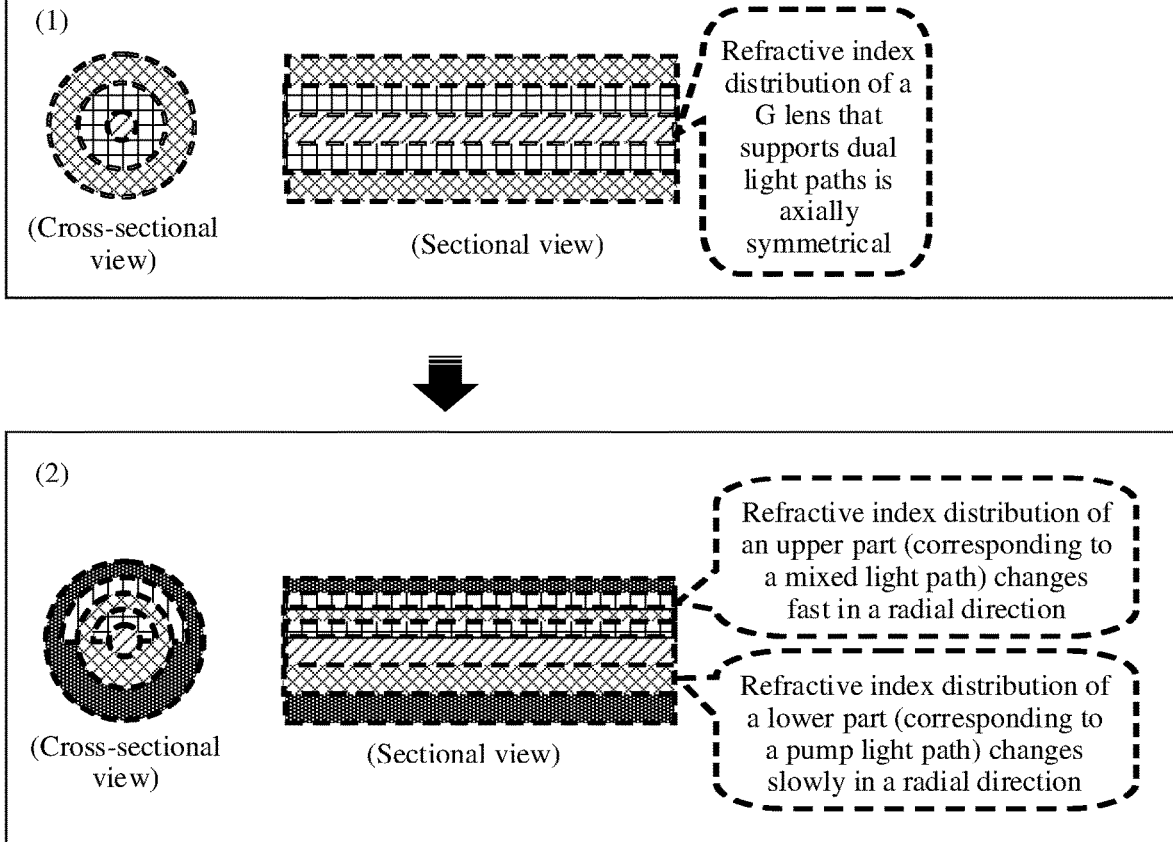

In still another possible design, as shown in FIG. 13, an asymmetric G lens may be used.

A refractive index of an upper part of the G lens (that is, the lens 2 in FIG. 9) changes faster in a radial direction than a refractive index of a lower part of the G lens (that is, the lens 2 in FIG. 9). In other words, a refractive index of a mixed light path corresponding to the G lens (that is, a light path corresponding to the first fiber or the gain fiber) changes faster in a radial direction than a refractive index of a pump light path corresponding to the G lens (that is, a light path corresponding to the second fiber). Compared with a conventional G lens that supports dual light paths, the G lens provided in this embodiment of this application is more flexible and can be applied in a large quantity of application scenarios.

It should be understood that, in the G lens, a speed at which a refractive index changes in a radial direction is relative, that is, a refractive index of an upper part in a radial direction changes faster than a refractive index of a lower part in a radial direction. Values of a refractive index of an upper part and a refractive index of a lower part that change in a radial direction are not limited.

It should be further understood that this embodiment of this application is applicable provided that a refractive index of a mixed light path corresponding to the G lens changes faster in a radial direction than a refractive index of a pump light path corresponding to the G lens.

The foregoing two designs are merely examples for description, and this embodiment of this application is not limited thereto.

According to the manner 2, a lens, such as an aspheric C lens or an asymmetric G lens, may be used to align light beams of fibers of different matrix, and/or align light beams of fibers of different matrix at a selected location (for example, a surface of a WDM diaphragm), and align light spots or spotsizes (including a size of the light spot or the spotsize, and/or a divergence angle of the light spot or the spotsize, and the like). To be specific, a light beam (for example, a light beam of mixed light) of an optical signal in the first fiber or the gain fiber and a light beam (for example, a light beam of pump light) of an optical signal in the second fiber are collimated, and/or light a spot or a spotsize of a light beam of an optical signal in the first fiber or the gain fiber and a spot or a spotsize of a light beam of an optical signal in the second fiber are adjusted.

It should be understood that the foregoing manner 1 and manner 2 are merely examples for description. Any light beam (for example, a light beam that collimates mixed light and pump light) that can collimate an optical signal, and/or any solution that can adjust a spotsize/light spot of a light beam may be used in embodiments of this application.

In this embodiment of this application, light spots or spotsizes (including a size and/or a divergence angle of a light spot or a spotsize) of optical signals may be the same or may be different. The following mainly describes a case in which spotsizes of optical signals are different.

Optionally, a spotsize of the mixed light output fiber (the first fiber or the gain fiber) may be smaller than a spotsize of the pump light input fiber (the second fiber), that is, $\Phi 3 < \Phi 1$; and/or a spotsize of the mixed light output fiber may be smaller than a spotsize of the signal light input fiber (the second fiber), that is, $\Phi 3 < \Phi 2$. A spotsize of pump light received by the WDM diaphragm should be the same as or similar to a spotsize of mixed light output by the WDM diaphragm, that is, $\Phi 4 \approx \Phi 5$.

In a possible case, in this embodiment of this application, a fiber spotsize of mixed light path corresponding to the two-fiber capillary tube 1 is less than a fiber spotsize of pump light path corresponding to the two-fiber capillary tube 1, that is, $\Phi 3 < \theta 2$.

Example 1: A lens (that is, the lens 2) allows that a spotsize of a mixed light path is different from a spotsize of a pump light path.

For example, the lens may be designed according to a spotsize of the mixed light path and a spotsize of the pump light path. For example, a curvature radius or refractive index distribution of the lens may be designed to adjust a focal length of the lens. The lens may be the lens shown in FIG. 12 or FIG. 13.

Based on the foregoing example 1, a lens, such as an aspheric C lens or an asymmetric G lens, may be used, to allow that a fiber spotsize of a mixed light path is different from a fiber spotsize of a pump light path corresponding to the lens.

Example 2: A two-fiber capillary tube (that is, the two-fiber capillary tube 1) is designed, so that a spotsize of mixed light path is different from a spotsize of pump light path.

For example, the two-fiber capillary tube may be designed according to a spotsize of the mixed light path and a spotsize of the pump light path. For example, a location of the two-fiber capillary tube may be designed to align with a focus of the lens. The two-fiber capillary tube 1 may strip off coating layers of the mixed light output fiber (the first fiber or the gain fiber) and the pump light input fiber (the second fiber), the mixed light output fiber and the pump light input fiber are inserted into the capillary tube, and then ground into an inclined plane and coated.

Example 3: Adjust the pump light input fiber (the second fiber). For example, a quartz glass matrix fiber that matches a spotsize of the mixed light output fiber (the first fiber or the gain fiber) is selected as the pump light input fiber.

According to embodiments of this application, a connection manner between the WDM in the fiber amplifier and the gain fiber can be changed by using the WDM provided in embodiments of this application. In the fiber amplifier, interconnection between the WDM and the gain fiber may be interconnection between homogeneous fibers (or similar to homogeneous fibers) (that is, the solution 1 in which the first fiber is a fiber whose matrix is the same as or similar to a matrix of the gain fiber, or refractive indexes and/or softening temperatures of the first fiber and the gain fiber are similar). Alternatively, no interconnection is required between the WDM and the gain fiber (that is, the solution 2 in which the WDM is directly connected to the gain fiber). In this way, a problem caused by splicing of heterogeneous fibers can be avoided.

The foregoing describes the WDM applicable to embodiments of this application with reference to FIG. 9 to FIG. 13. The following describes an isolator applicable to an embodiment of this application with reference to FIG. 14. The isolator may be the first optical component in the embodiment in FIG. 4. The isolator shown in FIG. 14 may be used in the fiber amplifiers shown in FIG. 4 to FIG. 8. The isolator shown in FIG. 14 may be separately used with the WDM shown in FIG. 9, or may be used in combination with the WDM shown in FIG. 9.

Figure 14:
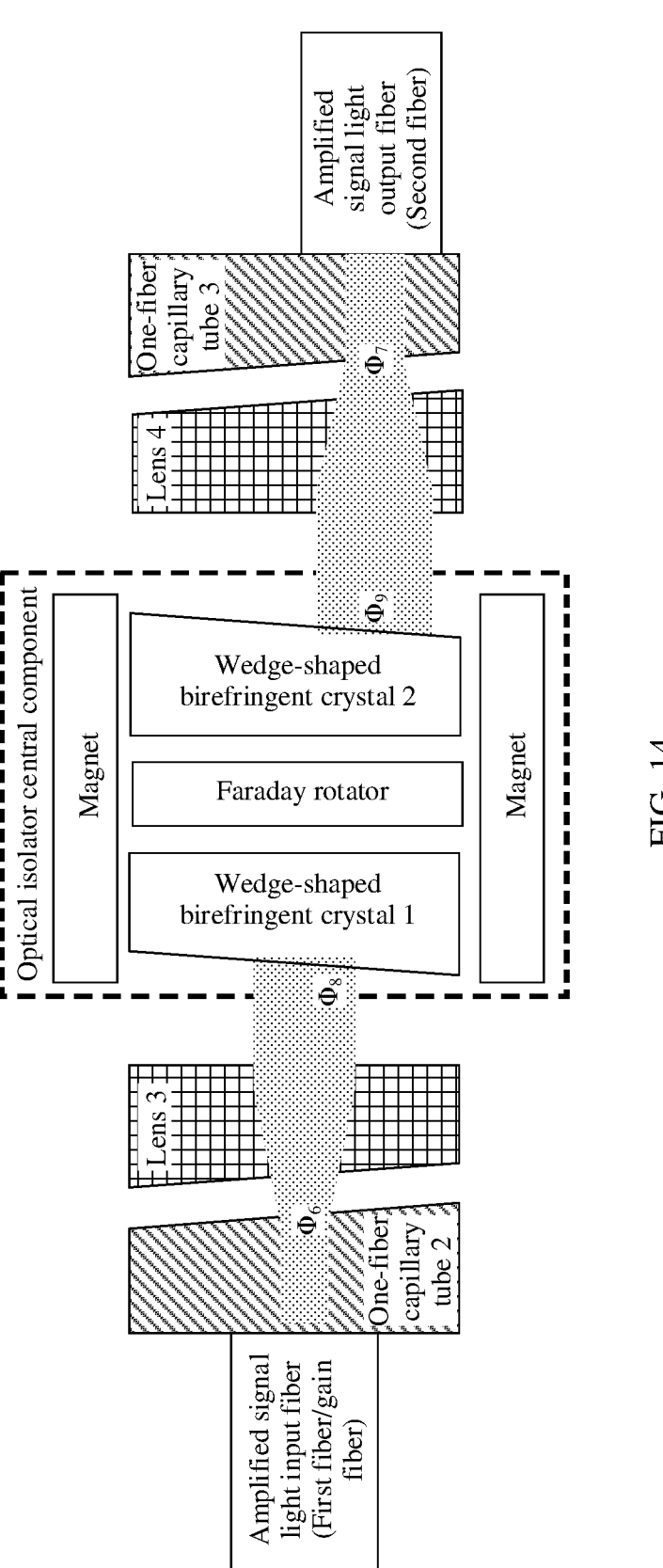
FIG. 14 is an example schematic diagram of an isolator applicable to an embodiment of this application.

FIG. 14 is a schematic diagram of an isolator applicable to an embodiment of this application. The isolator may include one or more lenses, for example, a lens 3 and a lens 4. The isolator may further include an optical isolator central component and at least one one-fiber capillary tube (for example, a one-fiber capillary tube 2 and a one-fiber capillary tube 3). For example, the optical isolator central component may include, for example, a wedge-shaped birefringent crystal (for example, a wedge-shaped birefringent crystal 1 and a wedge-shaped birefringent crystal 2) and a Faraday rotator.

The isolator is configured to: allow an optical signal transmitted in one direction to pass through or allow an optical signal transmitted in one direction to have a low loss, and prevent an optical signal transmitted in a reverse direction from passing through or allow an optical signal transmitted in a reverse direction to have a large loss. The isolator may be configured to suppress possible transmission of reflection light on a surface of an output end of an output fiber (for example, an amplified signal light output fiber in FIG. 14). Amplified signal light is sent to the optical isolator central component through an amplified signal light input fiber (the first fiber or the gain fiber), and then sent to the amplified signal light output fiber (the second fiber). Possible reflection light on a surface of an output end of the amplified signal light output fiber may be sent to the optical isolator central component through the amplified signal light output fiber, but cannot be sent to the amplified signal light input fiber through the optical isolator central component. This suppresses reverse transmission of the possible reflection light.

FIG. 14 is used as an example. A possible procedure is described as follows.

(1) A one-fiber capillary tube 2 introduces amplified signal light from a first fiber or a gain fiber (that is, an amplified signal light input fiber), and sends the amplified signal light to a lens 3.

In a possible implementation, a coating layer of the first fiber or the gain fiber may be stripped, the first fiber or the gain fiber is inserted into the capillary tube, and then ground into an inclined plane and coated. The lens 3 mainly collimates signal light sent by the one-fiber capillary tube 2. The one-fiber capillary tube 2 sends the signal light to the space, and the signal light diverges in the space. Therefore, after the signal light is collimated by the lens 3, the signal light may be converted into parallel light or approximately parallel light.

(2) As a core of the optical isolator, an optical isolator central component may be configured to implement unidirectional transmission of an optical signal.

In a possible implementation, the optical isolator central component sends the amplified signal light received from the lens 3 to a lens 4, and at the same time sends possible reflection light that is of a next gain fiber and that is sent from the lens 4 to the lens 3 in a direction deviating from an optical path from the one-fiber capillary tube 2 to the lens 3. Because the next possible reflection light deviates from the direction, after the lens 3 receives the possible reflection light of the next gain fiber, the lens 3 cannot couple the reflection light into the amplified signal light input fiber. For example, the optical isolator central component may include two wedge-shaped birefringent crystals, a magnet, and a Faraday rotator made of yttrium (Y) iron garnet.

(3) After the lens 4 receives the amplified signal light sent by the optical isolator central component, the lens 4 sends the amplified signal light to the one-fiber capillary tube 3, and finally the amplified signal light is output through the amplified signal light output fiber (that is, the second fiber). Functions and implementations of the foregoing procedure are similar to functions and implementations of the amplified signal light input fiber, the one-fiber capillary tube 2, and the lens 3, but directions are opposite.

It should be understood that the foregoing procedure is merely an example for description, and this embodiment of this application is not limited thereto.

In this embodiment of this application, the amplified signal light input fiber is the first fiber (the solution 1) or the gain fiber (the solution 2), and the amplified signal light output fiber is the second fiber.

For the first fiber and the second fiber, refer to the foregoing descriptions.

Optionally, a light beam of the amplified signal light may be adjusted or collimated in any one of the following manners:

Manner 1: An included angle between fibers in the one-fiber capillary tube 2 and the one-fiber capillary tube 3 is adjusted, so that the fibers in the one-fiber capillary tube 2 and the one-fiber capillary tube 3 are not parallel, to facilitate collimation of the light beam of the amplified signal light.

For example, the included angle between the fibers in the one-fiber capillary tube 2 and the one-fiber capillary tube 3 may be adjusted based on a refractive index of the first fiber or the gain fiber and a refractive index of the second fiber, to facilitate collimation or adjust the light beam of the amplified signal light.

For example, a location of the amplified signal light input fiber in the one-fiber capillary tube 2 may be adjusted according to a refraction principle and a refractive index of the amplified signal light input fiber, to facilitate collimation of the light beam of the amplified signal light. For example, the light beam of the amplified signal light is aligned with a corresponding location of the optical isolator central component.

For details, refer to the description of manner 1 in the embodiment shown in FIG. 9.

Manner 2: A light beam of an optical signal of a fiber in a one-fiber capillary tube is adjusted by using a lens, for example, a light spot or a spotsize of the optical signal of the fiber in the one-fiber capillary tube is adjusted by using the lens, to facilitate collimation of the light beam of the amplified signal light, and/or align light spots or spotsizes (including a size of a light spot or a spotsize, and/or a divergence angle of a light spot or a spotsize, and the like) of an optical signal of a fiber in the one-fiber capillary tube 2 and an optical signal of a fiber in the one-fiber capillary tube 3 on the optical isolator central component.

As shown in FIG. 14, the lens 3 in the isolator is configured to collimate and/or adjust a light beam of an optical signal of a fiber in the one-fiber capillary tube 2 (a light beam of an optical signal of the first fiber or the gain fiber). The lens 4 in the isolator is configured to collimate and/or adjust a light beam of an optical signal of a fiber in the one-fiber capillary tube 3 (a light beam of an optical signal of the second fiber).

Optionally, a focal length of the lens 3 is less than a focal length of the lens 4.

It should be understood that the foregoing manner 1 and manner 2 are merely examples for description. Any solution that can collimate and/or adjust a light beam of an optical signal (for example, collimate and/or adjust a light beam of amplified signal light) may be used in this embodiment of this application.

In this embodiment of this application, light spots or spotsizes (including a size and/or a divergence angle of a light spot or a spotsize) of optical signals may be the same or may be different. The following mainly describes a case in which spotsizes of optical signals are different.

Optionally, a spotsize of the amplified signal light input fiber (the first fiber or the gain fiber) may be smaller than a spotsize of the amplified signal light output fiber (the second fiber), that is, $\Phi6<\Phi7$. A spotsize $\Phi8$ of amplified signal light received by the optical isolator central component is related to a spotsize $\Phi9$ of amplified signal light sent by the optical isolator central component, and $\Phi9$ is related to $\Phi7$.

Example 1: A lens (for example, the lens 3) allows that a spotsize of the amplified signal light output fiber is different from a spotsize of the amplified signal light input fiber.

For example, the lens 3 may be designed according to the spotsize of the amplified signal light output fiber and the spotsize of the amplified signal light input fiber. For example, a curvature radius or refractive index distribution of the lens 3 may be designed.

Based on the foregoing example 1, a lens may be used, to allow that spotsizes of the amplified signal light output fiber and the amplified signal light input fiber are different.

Example 2: A one-fiber capillary tube (for example, the one-fiber capillary tube 2 and the one-fiber capillary tube 3) is designed to allow that a spotsize of the amplified signal light output fiber is different from a spotsize of the amplified signal light input fiber.

For example, the one-fiber capillary tube 2 and the one-fiber capillary tube 3 may be designed according to spotsizes of the amplified signal light output fiber and the amplified signal light input fiber, to align with a corresponding location of the optical isolator central component. For example, locations of the one-fiber capillary tube 2 and the one-fiber capillary tube 3 may be designed.

Example 3: Adjust the amplified signal light output fiber (the second fiber). For example, a quartz glass matrix fiber that matches a spotsize of the amplified signal light input fiber (the first fiber or the gain fiber) is selected as the amplified signal light output fiber.

According to this embodiment of this application, a connection manner between the isolator in the fiber amplifier and the gain fiber can be changed by using the isolator provided in this embodiment of this application. In the fiber amplifier, interconnection between the isolator and the gain fiber may be interconnection between homogeneous fibers (or similar to homogeneous fibers) (that is, the solution 1 in which the first fiber is a fiber whose matrix is the same as or similar to a matrix of the gain fiber, or refractive indexes and/or softening temperatures of the first fiber and the gain fiber are similar). Alternatively, no interconnection is required between the isolator and the gain fiber (that is, the solution 2 in which the isolator is directly connected to the gain fiber). In this way, a problem caused by splicing of heterogeneous fibers can be avoided.

The foregoing describes the WDM applicable to embodiments of this application with reference to FIG. 9 to FIG. 13, and describes the isolator applicable to embodiments of this application with reference to FIG. 14. The following describes, with reference to FIG. 15, a fiber adapter applicable to embodiments of this application. The fiber adapter may be the first optical component in the embodiment in FIG. 4. The fiber adapter shown in FIG. 15 may be used in the fiber amplifiers shown in FIG. 4 to FIG. 8. The fiber adapter shown in FIG. 15 may be separately used with the WDM shown in FIG. 9 and the isolator shown in FIG. 14, or may be used in combination with the WDM shown in FIG. 9 and the isolator shown in FIG. 14

Figure 15:
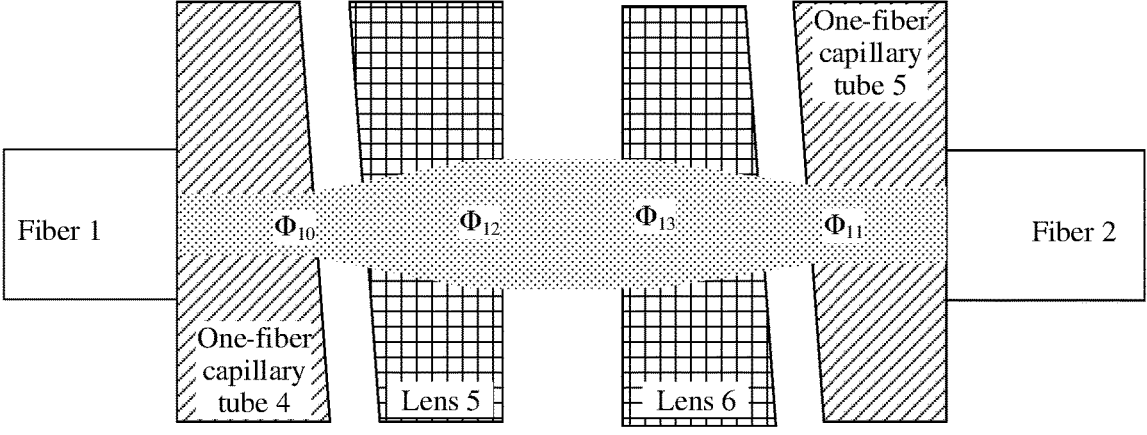
FIG. 15 is an example schematic diagram of a fiber adapter applicable to an embodiment of this application.

FIG. 15 is a schematic diagram of a fiber adapter applicable to an embodiment of this application. The fiber adapter may include one or more lenses, for example, a lens 5 and a lens 6. The fiber adapter may further include at least one one-fiber capillary tube, for example, a one-fiber capillary tube 4 and a one-fiber capillary tube 5. The fiber adapter may also be denoted as a heterogeneous fiber adapter or an adapter. The fiber adapter may be the adapter 1 shown in FIG. 7 or FIG. 8, or may be the adapter 2 shown in FIG. 7 or FIG. 8.

The fiber adapter is configured to connect the first fiber and the second fiber, or the fiber adapter is configured to connect the second fiber and the gain fiber. The fiber adapter may be configured to implement spatial coupling of fibers having different refractive indexes or softening temperatures. Therefore, a fiber connection loss can be reduced.

Because a light path is reversible, an optical signal in FIG. 15 may be input from a fiber 1 and output from a fiber 2; or an optical signal in FIG. 15 may be input from the fiber 2 and output from the fiber 1. The fiber 1 is the first fiber or the gain fiber, and the fiber 2 is the second fiber; or the fiber 2 is the first fiber or the gain fiber, and the fiber 1 is the second fiber.

For example, when the fiber adapter shown in FIG. 15 is the adapter 1 in FIG. 7, the fiber 1 may be the second fiber, and the fiber 2 may be the first fiber.

For another example, when the fiber adapter shown in FIG. 15 is the adapter 2 in FIG. 7, the fiber 1 may be the first fiber, and the fiber 2 may be the second fiber.

For another example, when the fiber adapter shown in FIG. 15 is the adapter 1 in FIG. 8, the fiber 1 may be the second fiber, and the fiber 2 may be the gain fiber.

For another example, when the fiber adapter shown in FIG. 15 is the adapter 2 in FIG. 8, the fiber 1 may be the gain fiber, and the fiber 2 may be the second fiber.

In an example, an optical signal is input from the fiber 1 and a spotsize of the fiber 1 is smaller than a spotsize of the fiber 2. In a possible process, the optical signal is input from the fiber 1, and the one-fiber capillary tube 4 introduces the optical signal from the fiber 1 and sends the optical signal to the lens 5. The lens 5 collimates the optical signal, and sends the optical signal to the lens 6. The lens 6 couples the optical signal into the one-fiber capillary tube 5 and the fiber 2.

Optionally, an included angle between fibers in the one-fiber capillary tube 4 and the one-fiber capillary tube 5 is adjusted, so that the fibers in the one-fiber capillary tube 4 and the one-fiber capillary tube 5 are not parallel, to facilitate collimation of a light beam of the optical signal (a light beam of amplified signal light).

Optionally, an light beam of an optical signal of a fiber in a one-fiber capillary tube is adjusted by using the lens, for example, a light spot or a spotsize of the optical signal of the fiber in the one-fiber capillary tube is adjusted by using the lens, to facilitate collimation of the light beam of the optical signal (a light beam of amplified signal light), and/or align light spots or spotsizes (including a size of a light spot or a spotsize, and/or a divergence angle of a light spot or a spotsize, and the like) of an optical signal of a fiber in the one-fiber capillary tube 4 and an optical signal of a fiber in the one-fiber capillary tube 5 between the lens 5 and the lens 6.

Optionally, a focal length of a lens configured to introduce the first fiber or the gain fiber into the fiber adapter is less than a focal length of a lens configured to introduce the second fiber into the fiber adapter.

Optionally, a lens (for example, the lens 5 or the lens 6) allows that a spotsize of the fiber 1 is different from a spotsize of the fiber 2.

Optionally, a one-fiber capillary tube (for example, the one-fiber capillary tube 4 or the one-fiber capillary tube 5) is designed to allow that a spotsize of the fiber 1 is different from a spotsize of the fiber 2.

For the one-fiber capillary tube 4, refer to the one-fiber capillary tube 2 shown in FIG. 14. For the one-fiber capillary tube 5, refer to the one-fiber capillary tube 3 shown in FIG. 14. For the lens 5, refer to the lens 3 shown in FIG. 14. For the lens 6, refer to the lens 4 shown in FIG. 14. Alternatively, for the one-fiber capillary tube 5, refer to the one-fiber capillary tube 2 shown in FIG. 14. For the one-fiber capillary tube 4, refer to the one-fiber capillary tube 3 shown in FIG. 14. For the lens 6, refer to the lens 3 shown in FIG. 14. For the lens 5, refer to the lens 4 shown in FIG. 14.

According to this embodiment of this application, a connection manner between each optical module in the fiber amplifier and the gain fiber can be changed by using the fiber adapter provided in this embodiment of this application. In the fiber amplifier, interconnection between the fiber adapter and the gain fiber may be interconnection between homogeneous fibers (or similar to homogeneous fibers) (that is, the solution 1 in which the first fiber is a fiber whose matrix is the same as or similar to a matrix of the gain fiber, or refractive indexes and/or softening temperatures of the first fiber and the gain fiber are similar). Alternatively, no interconnection is required between the fiber adapter and the gain fiber (that is, the solution 2 in which the fiber adapter is directly connected to the gain fiber). The interconnection between the fiber adapter and the WDM or the isolator may be interconnection between homogeneous fibers (or similar to homogeneous fibers) (for example, a matrix of a fiber connecting the fiber adapter to the WDM or the isolator is the same as a matrix of the second fiber). Alternatively, no interconnection is required (that is, a fiber connecting the fiber adapter to the WDM or isolator is the second fiber). In this way, a problem caused by splicing of heterogeneous fibers can be avoided.

In some of the foregoing embodiments, the WDM, the isolator, and the fiber adapter are used as examples for description. This is not limited. This embodiment of this application is applicable provided that fibers connected to different optical modules (or optical components) are not completely the same. For example, the optical component is directly connected to the gain fiber, and a fiber connecting the optical component to another optical component or a fiber through which an optical signal is input/output is a fiber different from the gain fiber. In still another example, the optical component is connected to the gain fiber by using the first fiber, and a fiber connecting the optical component to another optical component or a fiber through which an optical signal is input/output is a fiber different from the first fiber.

The foregoing describes apparatus embodiments (such as an optical component and a fiber amplifier) applicable to embodiments of this application with reference to FIG. 4 to FIG. 15. The following describes method embodiments of this application in detail with reference to FIG. 16 to FIG. 19. The description on the apparatus side corresponds to the description on the method side. For brevity, repeated descriptions are appropriately omitted.

Figure 16:
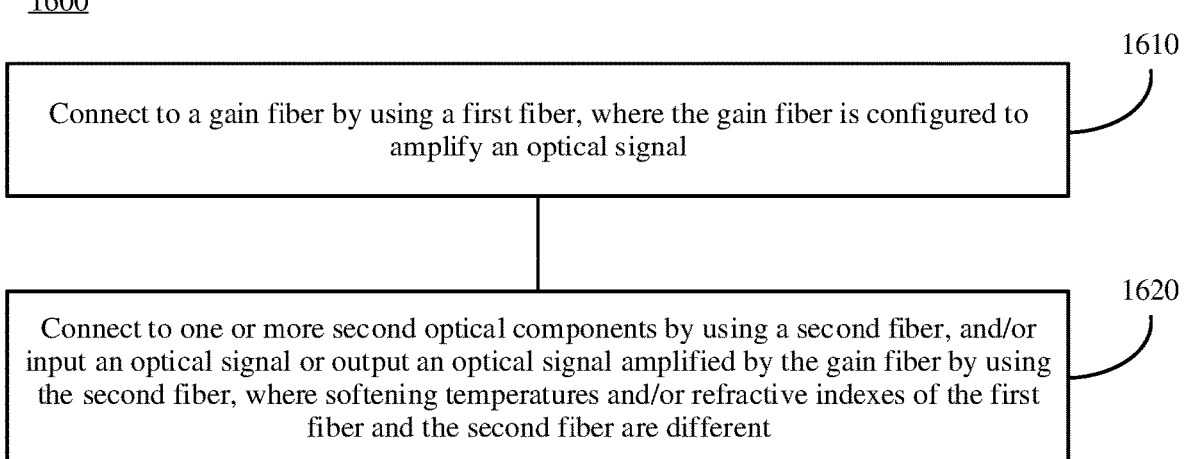
FIG. 16 is an example schematic diagram of a method for manufacturing an optical component according to an embodiment of this application.

FIG. 16 is a schematic flowchart of a method for manufacturing an optical component according to an embodiment of this application. The optical component obtained based on a method 1600 in FIG. 16 may be the first optical component (the first optical component in the solution 1) mentioned above, or may be used in the fiber amplifier (the fiber amplifier in the solution 1) mentioned above. The method 1600 may include the following steps:

1610: Connect to a gain fiber by using a first fiber, where the gain fiber is configured to amplify an optical signal.

1620: Connect to one or more second optical components by using a second fiber, and/or input an optical signal or output an optical signal amplified by the gain fiber by using the second fiber, where softening temperatures and/or refractive indexes of the first fiber and the second fiber are different.

For example, a difference (or an absolute value of a difference) between softening temperatures of the first fiber and the second fiber is greater than a difference (or an absolute value of a difference) between softening temperatures of the first fiber and the gain fiber.

In still another example, a difference between refractive indexes (or an absolute value of a difference) of the first fiber and the second fiber is greater than a difference between refractive indexes (or an absolute value of a difference) of the first fiber and the gain fiber.

In still another example, a matrix of the first fiber is the same as a matrix of the gain fiber.

In still another example, an optical signal input by using the second fiber arrives at the first fiber through at least a section of free space, or an optical signal input by using the first fiber arrives at the second fiber through at least a section of free space.

In still another example, the first fiber and/or the second fiber from which a coating layer is stripped are/is introduced or assembled into the optical component through at least one capillary tube.

In still another example, the first fiber and the gain fiber are connected in a splicing manner.

In still another example, the optical component is any one or more of the following: a wavelength division multiplexer WDM, an isolator, and a fiber adapter.

In still another example, the optical component is the WDM, and the WDM includes a two-fiber capillary tube. Two fibers are introduced into the WDM through the two-fiber capillary tube. One of the two fibers is the first fiber, the other one of the two fibers is the second fiber, and the other one of the two fibers is configured to: connect to a pump laser, input an optical signal, or output an optical signal amplified by the gain fiber.

In still another example, the two fibers in the two-fiber capillary tube are not parallel.

In still another example, the WDM includes a first lens, and light beams of optical signals in the two fibers are adjusted through the two-fiber capillary tube.

In still another example, a curvature radius of a curved surface part of an optical path of an optical signal in the first fiber corresponding to the first lens is less than a curvature radius of a curved surface part of an optical path of an optical signal in the second fiber corresponding to the first lens; or a radial refractive index of an optical path of an optical signal in the first fiber corresponding to the first lens changes faster than a radial refractive index of an optical path of an optical signal in the second fiber corresponding to the first lens.

In still another example, the first lens allows that spotsizes of the optical signals in the two fibers in the two-fiber capillary tube are different.

In still another example, spotsizes of the optical signals in the two fibers in the two-fiber capillary tube match.

In still another example, the optical component is the isolator, where the isolator includes a first one-fiber capillary tube and a second one-fiber capillary tube. The first fiber is introduced into the isolator through the first one-fiber capillary tube, and the second fiber is introduced into the isolator through the second one-fiber capillary tube.

In still another example, a fiber in the first one-fiber capillary tube and a fiber in the second one-fiber capillary tube are not parallel.

In still another example, the isolator includes a second lens and a third lens. A light beam of an optical signal of a fiber in the first one-fiber capillary tube is adjusted by using the second lens, and a light beam of an optical signal of a fiber in the second one-fiber capillary tube is adjusted by using the third lens.

In still another example, a focal length of the second lens is less than a focal length of the third lens.

In still another example, the optical component is the fiber adapter, where the fiber adapter includes a third one-fiber capillary tube and a fourth one-fiber capillary tube. The first fiber is introduced into the fiber adapter through the third one-fiber capillary tube, and the second fiber is introduced into the fiber adapter through the fourth one-fiber capillary tube.

In still another example, a fiber in the third one-fiber capillary tube and a fiber in the fourth one-fiber capillary tube are not parallel.

In still another example, the fiber adapter includes a fourth lens and a fifth lens. A light beam of an optical signal of a fiber in the third one-fiber capillary tube is adjusted by using the fourth lens, and a light beam of an optical signal of a fiber in the fourth one-fiber capillary tube is adjusted by using the fifth lens.

In still another example, a focal length of the fourth lens is less than a focal length of the fifth lens.

FIG. 17 is a schematic flowchart of a method for manufacturing an optical component according to still another embodiment of this application. The optical component obtained based on a method 1700 in FIG. 17 may be the first optical component (the first optical component in the solution 2) mentioned above, or may be used in the fiber amplifier (the fiber amplifier in the solution 2) mentioned above. The method 1700 may include the following steps:

1710: Directly connect to a gain fiber, where the gain fiber is configured to amplify an optical signal.

1720: Connect to one or more second optical components by using a second fiber, and/or input an optical signal or output an optical signal amplified by the gain fiber by using the second fiber, where softening temperatures and/or refractive indexes of the second fiber and the gain fiber are different.

For example, an optical signal input by using the second fiber arrives at the gain fiber through at least a section of free space, or an optical signal input by using the gain fiber arrives at the second fiber through at least a section of free space.

In still another example, the gain fiber and/or the second fiber from which a coating layer is stripped are/is introduced or assembled into the optical component through at least one capillary tube.

In still another example, the optical component is any one or more of the following: a wavelength division multiplexer WDM, an isolator, and a fiber adapter.

In still another example, the optical component is the WDM, and the WDM includes a two-fiber capillary tube.

Two fibers are introduced into the WDM through the two-fiber capillary tube. One of the two fibers is the gain fiber, the other one of the two fibers is the second fiber, and the other one of the two fibers is configured to: connect to a pump laser, input an optical signal, or output an optical signal amplified by the gain fiber.

In still another example, the two fibers in the two-fiber capillary tube are not parallel.

In still another example, the WDM includes a first lens, and light beams of optical signals in the two fibers are adjusted through the two-fiber capillary tube.

In still another example, a curvature radius of a curved surface part of an optical path of an optical signal in the gain fiber corresponding to the first lens is less than a curvature radius of a curved surface part of an optical path of an optical signal in the second fiber corresponding to the first lens; or a radial refractive index of an optical path of an optical signal in the gain fiber corresponding to the first lens changes faster than a radial refractive index of an optical path of an optical signal in the second fiber corresponding to the first lens.

In still another example, the first lens allows that spotsizes of the optical signals in the two fibers in the two-fiber capillary tube are different.

In still another example, spotsizes of the optical signals in the two fibers in the two-fiber capillary tube match.

In still another example, the optical component is the isolator, where the isolator includes a first one-fiber capillary tube and a second one-fiber capillary tube. The gain fiber is introduced into the isolator through the first one-fiber capillary tube, and the second fiber is introduced into the isolator through the second one-fiber capillary tube.

In still another example, a fiber in the first one-fiber capillary tube and a fiber in the second one-fiber capillary tube are not parallel.

In still another example, the isolator includes a second lens and a third lens. A light beam of an optical signal of a fiber in the first one-fiber capillary tube is adjusted by using the second lens, and a light beam of an optical signal of a fiber in the second one-fiber capillary tube is adjusted by using the third lens.

In still another example, a focal length of the second lens is less than a focal length of the third lens.

In still another example, the optical component is the fiber adapter, where the fiber adapter includes a third one-fiber capillary tube and a fourth one-fiber capillary tube. The gain fiber is introduced into the fiber adapter through the third one-fiber capillary tube, and the second fiber is introduced into the fiber adapter through the fourth one-fiber capillary tube.

In still another example, a fiber in the third one-fiber capillary tube and a fiber in the fourth one-fiber capillary tube are not parallel.

In still another example, the fiber adapter includes a fourth lens and a fifth lens. A light beam of an optical signal of a fiber in the third one-fiber capillary tube is adjusted by using the fourth lens, and a light beam of an optical signal of a fiber in the fourth one-fiber capillary tube is adjusted by using the fifth lens.

In still another example, a focal length of the fourth lens is less than a focal length of the fifth lens.

FIG. 18 is a schematic flowchart of a method for manufacturing a fiber amplifier according to an embodiment of this application. The fiber amplifier obtained based on a method 1800 in FIG. 18 may be in the fiber amplifier mentioned above (the fiber amplifier in the solution 1). The method 1800 may include the following steps:

1810: Connect a first optical component to a gain fiber by using a first fiber, where the gain fiber is configured to amplify an optical signal.

1820: Connect the first optical component to one or more second optical components by using a second fiber, and/or input an optical signal or output an optical signal amplified by the gain fiber by using the second fiber, where softening temperatures and/or refractive indexes of the first fiber and the second fiber are different.

The first optical component is the first optical component mentioned above.

FIG. 19 is a schematic flowchart of a method for manufacturing a fiber amplifier according to still another embodiment of this application. The fiber amplifier obtained based on a method 1900 in FIG. 19 may be in the fiber amplifier mentioned above (the fiber amplifier in the solution 2). The method 1900 may include the following steps:

1910: Directly connect a first optical component to a gain fiber, where the gain fiber is configured to amplify an optical signal.

1920: Connect the first optical component to one or more second optical components by using a second fiber, and/or input an optical signal or output an optical signal amplified by the gain fiber by using the second fiber, where softening temperatures and/or refractive indexes of the second fiber and the gain fiber are different.

The first optical component is the first optical component mentioned above.

A person of ordinary skill in the art may be aware that, in combination with the examples described in embodiments disclosed in this specification, steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the protection scope of this application.

It may be understood by a person skilled in the art that, for the purpose of convenient and brief description, for a detailed working process of the foregoing method, refer to a corresponding process in the foregoing apparatus embodiments.

All or some of the foregoing embodiments may be implemented by using software, hardware, firmware, or any combination thereof.

When software is used to implement the embodiments, all or a part of the embodiments may be implemented in a form of a computer program product. The computer program product includes one or more computer instructions. When the computer program instructions are loaded and executed on a computer, the procedure or functions according to embodiments of this application are all or partially generated. The computer may be a general-purpose computer, a dedicated computer, a computer network, or other programmable apparatuses. For example, the computer may be a personal computer, a server, or a network device. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, a fiber, or a digital subscriber line (DSL)) or wireless (for example, infrared, radio, or microwave) manner. For the computer-readable storage medium, refer to the foregoing descriptions.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims and this specification.

What is claimed is:

1. An optical component, wherein
the optical component is applied in a fiber amplifier,
the optical component is configured to connect to a gain fiber by using a first fiber, or the optical component is configured for direct connection to the gain fiber, and the gain fiber is configured to amplify an optical signal,
the optical component is configured to connect to one or more second optical components in the fiber amplifier by using a second fiber, or the optical component is configured to input an optical signal or output an optical signal amplified by the gain fiber by using the second fiber,
softening temperatures and/or refractive indexes of the first fiber and the second fiber are different, or the softening temperatures and/or the refractive indexes of the second fiber and the gain fiber are different,
an absolute value of a difference between the softening temperatures of the first fiber and the second fiber is greater than an absolute value of a difference between the softening temperatures of the first fiber and the gain fiber, and
an absolute value of the difference between the refractive indexes of the first fiber and the second fiber is greater than an absolute value of a difference between the refractive indexes of the first fiber and the gain fiber.

2. The optical component according to claim 1, wherein
an optical signal input by the optical component by using the second fiber arrives at the first fiber or the gain fiber through at least a section of free space, or
an optical signal input by the optical component by using the first fiber or the gain fiber arrives at the second fiber through at least the section of free space.

3. The optical component according to claim 1, comprising:
at least one capillary tube configured to introduce, into the optical component, one or more of the following items from which a coating layer is stripped: the first fiber, the second fiber, and the gain fiber.

4. The optical component according to claim 1, wherein
the first fiber and the gain fiber are connected in a splicing manner.

5. The optical component according to claim 1, wherein
the optical component is any one or more of: a wavelength division multiplexer (WDM), an isolator, and a fiber adapter, and
the fiber adapter is configured to connect the first fiber and the second fiber, or the fiber adapter is configured to connect the second fiber and the gain fiber.

6. The optical component according to claim 5, wherein
the optical component is the WDM,
the WDM comprises a two-fiber capillary tube configured to introduce two fibers into the WDM,
one of the two fibers is the first fiber or the gain fiber, and the other one of the two fibers is the second fiber, and the other one of the two fibers is configured to: connect to a pump laser, input an optical signal, or output the optical signal amplified by the gain fiber.

7. The optical component according to claim 6, wherein the two fibers in the two-fiber capillary tube are not parallel to each other.

8. The optical component according to claim 6, wherein the WDM comprises a first lens configured to adjust light beams of optical signals in the two fibers in the two-fiber capillary tube.

9. The optical component according to claim 8, wherein a curvature radius of a curved surface part of an optical path of an optical signal in the first fiber, or the gain fiber, corresponding to the first lens is less than the curvature radius of the curved surface part of the optical path of the optical signal in the second fiber corresponding to the first lens, or a radial refractive index of the optical path of the optical signal in the first fiber, or the gain fiber, corresponding to the first lens changes faster than the radial refractive index of the optical path of the optical signal in the second fiber corresponding to the first lens.

10. The optical component according to claim 5, wherein the optical component is the isolator, the isolator comprises a first one-fiber capillary tube and a second one-fiber capillary tube, and the first one-fiber capillary tube is configured to introduce the first fiber or the gain fiber into the isolator, and the second one-fiber capillary tube is configured to introduce the second fiber into the isolator.

11. The optical component according to claim 10, wherein a fiber in the first one-fiber capillary tube and a fiber in the second one-fiber capillary tube are not parallel to each other.

12. The optical component according to claim 10, wherein the isolator comprises a second lens and a third lens, and the second lens is configured to adjust a light beam of an optical signal of the fiber in the first one-fiber capillary tube, and the third lens is configured to adjust the light beam of the optical signal of the fiber in the second one-fiber capillary tube.

13. The optical component according to claim 12, wherein a focal length of the second lens is less than the focal length of the third lens.

14. The optical component according to claim 5, wherein the optical component is the fiber adapter, the fiber adapter comprises a third one-fiber capillary tube and a fourth one-fiber capillary tube, and the third one-fiber capillary tube is configured to introduce the first fiber or the gain fiber into the fiber adapter, and the fourth one-fiber capillary tube is configured to introduce the second fiber into the fiber adapter.

15. The optical component according to claim 14, wherein a fiber in the third one-fiber capillary tube and a fiber in the fourth one-fiber capillary tube are not parallel to each other.

16. The optical component according to claim 14, wherein the fiber adapter comprises a fourth lens and a fifth lens, and the fourth lens is configured to adjust a light beam of an optical signal of the fiber in the third one-fiber capillary tube, and the fifth lens is configured to adjust the light beam of the optical signal of the fiber in the fourth one-fiber capillary tube.

17. A fiber amplifier, comprising:
a first optical component;
a gain fiber; and one or more second optical components, wherein
the gain fiber is configured to amplify an optical signal,
the first optical component is configured for connection to the gain fiber by using a first fiber, or the first optical component is configured to directly connect to the gain fiber,
the first optical component is configured for connection to the one or more second optical components by using a second fiber, and/or the first optical component is configured to input an optical signal or output an optical signal amplified by the gain fiber by using the second fiber,
softening temperatures and/or refractive indexes of the first fiber and the second fiber are different, or the softening temperatures and the refractive indexes of the second fiber and the gain fiber are different,
the first optical component is applied in a fiber amplifier,
an absolute value of a difference between the softening temperatures of the first fiber and the second fiber is greater than an absolute value of a difference between the softening temperatures of the first fiber and the gain fiber, and
an absolute value of the difference between the refractive indexes of the first fiber and the second fiber is greater than an absolute value of a difference between the refractive indexes of the first fiber and the gain fiber.

18. The fiber amplifier according to claim 17, wherein the optical component is a wavelength division multiplexer (WDM), the WDM comprises a two-fiber capillary tube configured to introduce two fibers into the WDM, one of the two fibers is the first fiber or the gain fiber, and the other one of the two fibers is the second fiber, and the other one of the two fibers is configured to: connect to a pump laser, input an optical signal, or output the optical signal amplified by the gain fiber.

19. A method for manufacturing a first optical component, the method comprising:
connecting to a gain fiber by using a first fiber, or directly connecting to the gain fiber, wherein the gain fiber is configured to amplify an optical signal; and
connecting to one or more second optical components by using a second fiber, and/or inputting an optical signal or outputting the optical signal amplified by the gain fiber by using the second fiber, wherein
softening temperatures and/or refractive indexes of the first fiber and the second fiber are different, or the softening temperatures and the refractive indexes of the second fiber and the gain fiber are different;
the first optical component is applied in a fiber amplifier,
an absolute value of a difference between the softening temperatures of the first fiber and the second fiber is greater than an absolute value of a difference between the softening temperatures of the first fiber and the gain fiber, and
an absolute value of the difference between the refractive indexes of the first fiber and the second fiber is greater than an absolute value of a difference between the refractive indexes of the first fiber and the gain fiber.

20. A method for manufacturing a fiber amplifier, comprising a first optical component, a gain fiber, and one or more second optical components, the gain fiber is configured to amplify an optical signal, and the method comprising:

connecting the first optical component to the gain fiber by using a first fiber, or directly connecting the first optical component to the gain fiber; and connecting the first optical component to the one or more second optical components by using a second fiber, and/or inputting an optical signal or outputting the optical signal amplified by the gain fiber by using the second fiber, wherein softening temperatures and/es refractive indexes of the first fiber and the second fiber are different, or the softening temperatures and/or the refractive indexes of the second fiber and the gain fiber are different, and the first optical component is applied in a fiber amplifier an absolute value of a difference between the softening temperatures of the first fiber and the second fiber is greater than an absolute value of a difference between the softening temperatures of the first fiber and the main fiber, and an absolute value of the difference between the refractive indexes of the first fiber and the second fiber is greater than an absolute value of a difference between the refractive indexes of the first fiber and the gain fiber.

\* \* \* \* \*